United States Patent
Kung et al.

(10) Patent No.: US 11,234,276 B2
(45) Date of Patent: Jan. 25, 2022

(54) METHOD AND APPARATUS FOR RANDOM ACCESS PROCEDURE FOR SECONDARY CELL BEAM FAILURE RECOVERY IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/220,311

(22) Filed: Apr. 1, 2021

(65) Prior Publication Data
US 2021/0321461 A1   Oct. 14, 2021

Related U.S. Application Data

(60) Provisional application No. 63/008,206, filed on Apr. 10, 2020.

(51) Int. Cl.
*H04W 74/08* (2009.01)
*H04W 72/12* (2009.01)
(Continued)

(52) U.S. Cl.
CPC ... *H04W 74/0833* (2013.01); *H04W 72/1289* (2013.01); *H04W 72/14* (2013.01); *H04W 76/18* (2018.02)

(58) Field of Classification Search
CPC ............. H04W 74/0833; H04W 76/18; H04W 72/1289; H04W 72/14
(Continued)

(56) References Cited

U.S. PATENT DOCUMENTS

2018/0070382 A1\* 3/2018 Lee ..................... H04W 56/001
2018/0270869 A1\* 9/2018 Tsai ..................... H04W 74/006
(Continued)

FOREIGN PATENT DOCUMENTS

CN          109922534 A    6/2019
KR     1020190116882 A   10/2019
(Continued)

OTHER PUBLICATIONS

ZTE Corporation, Sanechips, "Running MAC CR for 2-step RACH", 3GPP TSG-RAN WG2 Meeting #108, R2-1914798, Change Request, 38.321, CR CRnum rev Current Ver. 15.6.0, Nov. 18-22, 20149, Reno, US.

(Continued)

*Primary Examiner* — Peter G Solinsky
(74) *Attorney, Agent, or Firm* — Cooper Legal Group, LLC

(57) ABSTRACT

A method and apparatus are disclosed. In an example from the perspective of a User Equipment (UE), the UE initiates a random access procedure. The UE receives a Physical Downlink Control Channel (PDCCH) transmission. The UE determines whether contention resolution associated with the random access procedure is successful. If the initiating the random access procedure is performed for Special Cell (SpCell) beam failure recovery, the determining whether the contention resolution is successful is based on whether the PDCCH transmission is addressed to a Cell Radio Network Temporary Identifier (C-RNTI) of the UE. If the initiating the random access procedure is performed for Secondary Cell (SCell) beam failure recovery, the determining whether the contention resolution is successful is based on whether the PDCCH transmission is addressed to the C-RNTI of the UE and whether the PDCCH transmission contains an uplink (UL) grant for a new transmission.

20 Claims, 12 Drawing Sheets

(51) Int. Cl.
*H04W 72/14* (2009.01)
*H04W 76/18* (2018.01)

(58) Field of Classification Search
USPC .......................................................... 370/216
See application file for complete search history.

(56) References Cited

U.S. PATENT DOCUMENTS

| | | | |
|---|---|---|---|
| 2019/0215862 A1* | 7/2019 | Kim | H04W 74/0833 |
| 2019/0289661 A1* | 9/2019 | Chen | H04W 72/1284 |
| 2019/0306867 A1 | 10/2019 | Cirik et al. | |
| 2019/0320469 A1* | 10/2019 | Huang | H04L 5/0053 |
| 2020/0374960 A1* | 11/2020 | Deenoo | H04W 72/14 |
| 2021/0076384 A1* | 3/2021 | MolavianJazi | H04W 72/0453 |
| 2021/0076416 A1* | 3/2021 | Shah | H04W 74/085 |
| 2021/0126698 A1* | 4/2021 | Tsai | H04B 7/088 |
| 2021/0153193 A1* | 5/2021 | Lin | H04W 56/0065 |
| 2021/0159967 A1* | 5/2021 | Cirik | H04W 80/02 |
| 2021/0168858 A1* | 6/2021 | Liu | H04L 5/0012 |
| 2021/0168874 A1* | 6/2021 | Wei | H04W 74/0833 |
| 2021/0175955 A1* | 6/2021 | Kung | H04B 7/0695 |

FOREIGN PATENT DOCUMENTS

| | | |
|---|---|---|
| WO | 2019174036 A1 | 9/2019 |
| WO | 2020029203 A1 | 2/2020 |

OTHER PUBLICATIONS

Corresponding European Patent Application No. 21166496.6, Extended European Search Report dated Sep. 3, 2021.
ZTE Corporation, Nokia, Samsung, Vivo, R2, "Updates to MAC Spec for 2-step RACH", 3GPP TSG-RAN WG2 Meeting #109bis-e, R2-2002965, Electronic, Change Request, 38.321, pp. 1-138, CR 0714, Ver. 16.0.0, Apr. 20-30, 2020.
Corresponding Korean Patent Application No. 10-2021-0042606, Office Action dated Nov. 10, 2021. English Translation.

* cited by examiner

| E | T | R | R | BI | | | | Oct 1

FIG. 7

| E | T | RAPID | | | | | Oct 1

FIG. 8

METHOD AND APPARATUS FOR RANDOM ACCESS PROCEDURE FOR SECONDARY CELL BEAM FAILURE RECOVERY IN A WIRELESS COMMUNICATION SYSTEM

CROSS-REFERENCE TO RELATED APPLICATIONS

The present Application claims the benefit of U.S. Provisional Patent Application Ser. No. 63/008,206 filed on Apr. 10, 2020, the entire disclosure of which is incorporated herein in its entirety by reference.

FIELD

This disclosure generally relates to wireless communication networks, and more particularly, to a method and apparatus for random access procedure for a Secondary Cell (SCell) beam failure recovery in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE initiates a random access procedure. The UE receives a Physical Downlink Control Channel (PDCCH) transmission. The UE determines whether contention resolution associated with the random access procedure is successful. If the initiating the random access procedure is performed for Special Cell (SpCell) beam failure recovery, the determining whether the contention resolution is successful is based on whether the PDCCH transmission is addressed to a Cell Radio Network Temporary Identifier (C-RNTI) of the UE. If the initiating the random access procedure is performed for Secondary Cell (SCell) beam failure recovery, the determining whether the contention resolution is successful is based on whether the PDCCH transmission is addressed to the C-RNTI of the UE and whether the PDCCH transmission comprises an uplink (UL) grant for a new transmission.

BRIEF DESCRIPTION OF THE DRAWINGS

FIG. 7 is a diagram illustrating a MAC subheader according to one exemplary embodiment.

FIG. 8 is a diagram illustrating a MAC subheader according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP specification 38.321 16.0.0. The standards and documents listed above are hereby expressly incorporated by reference in their entirety.

Figure 1:
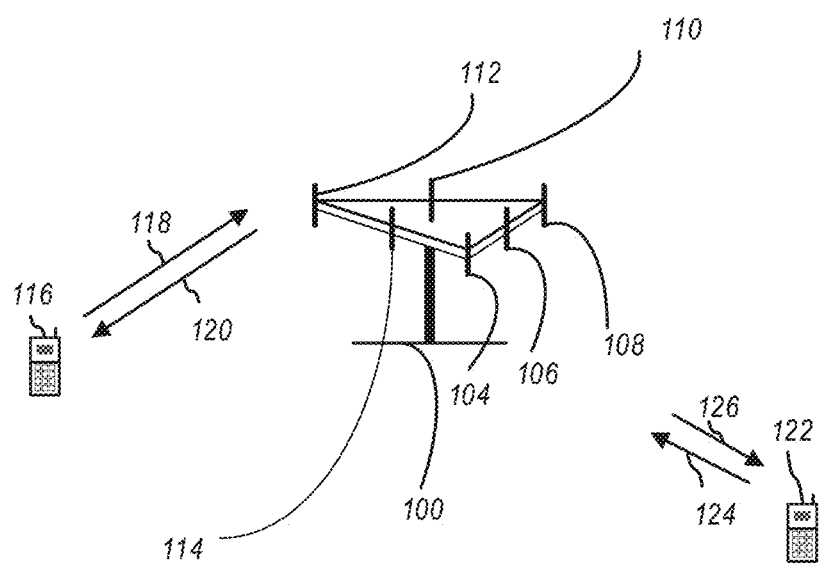
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
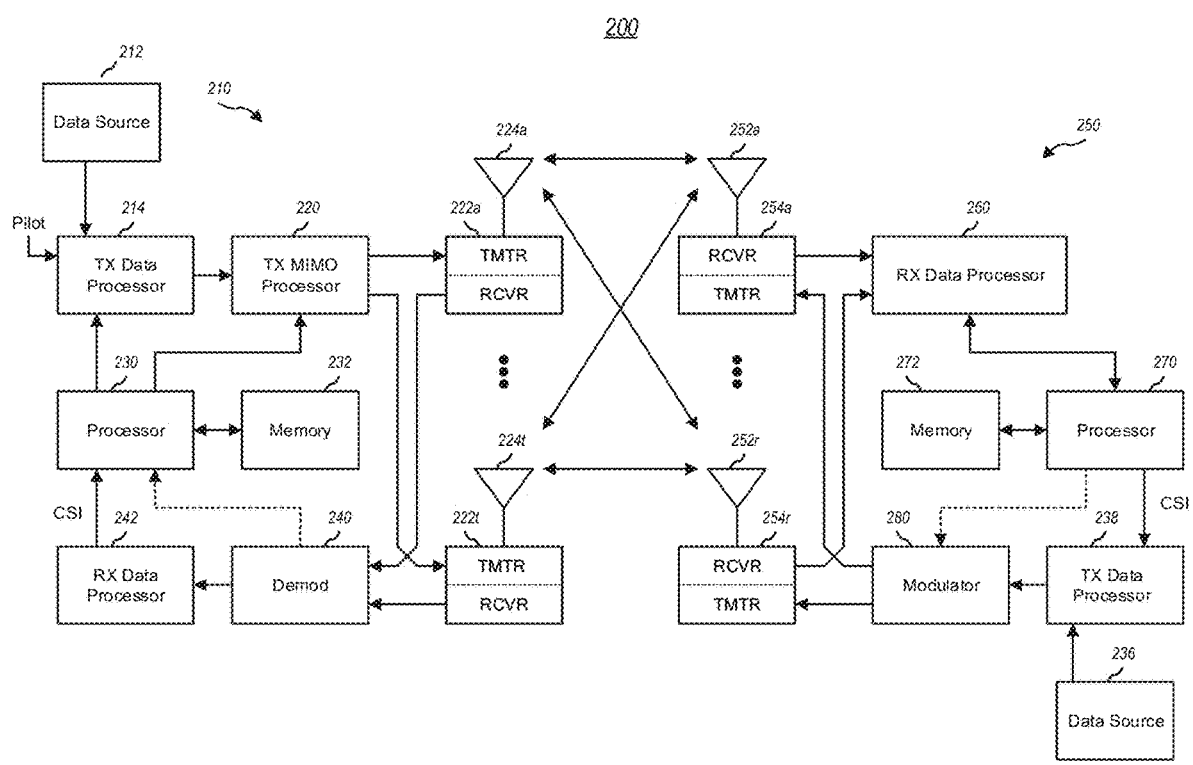
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
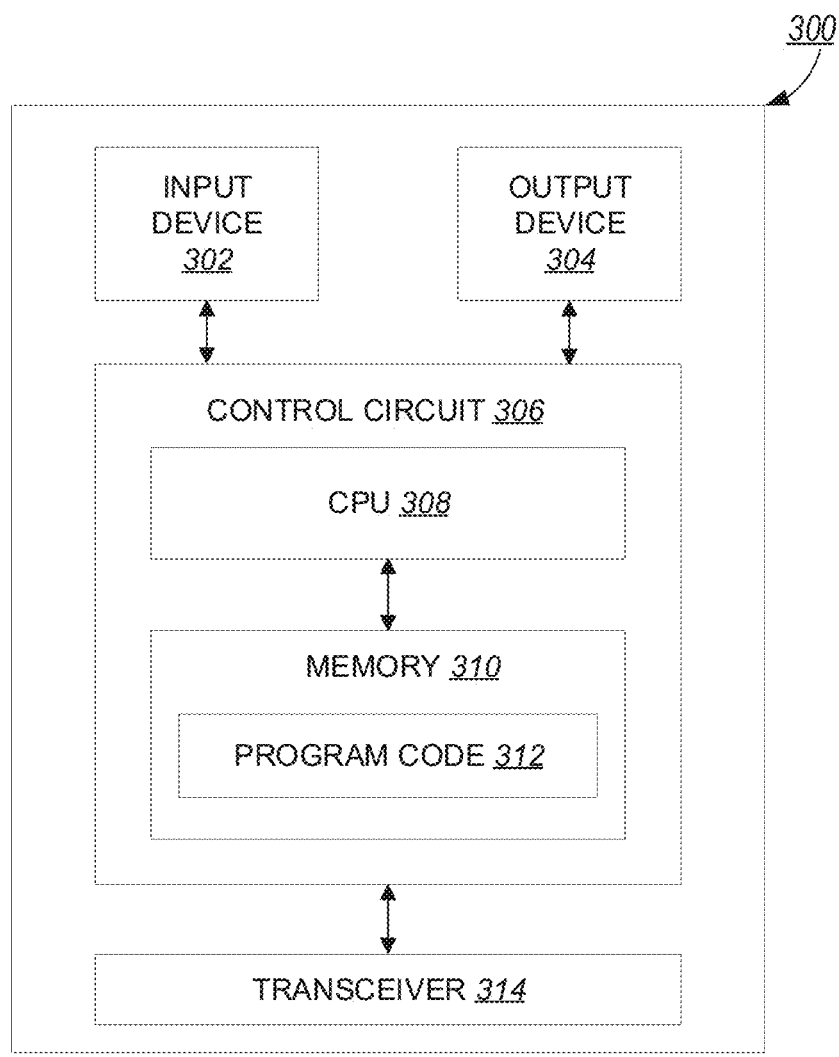
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
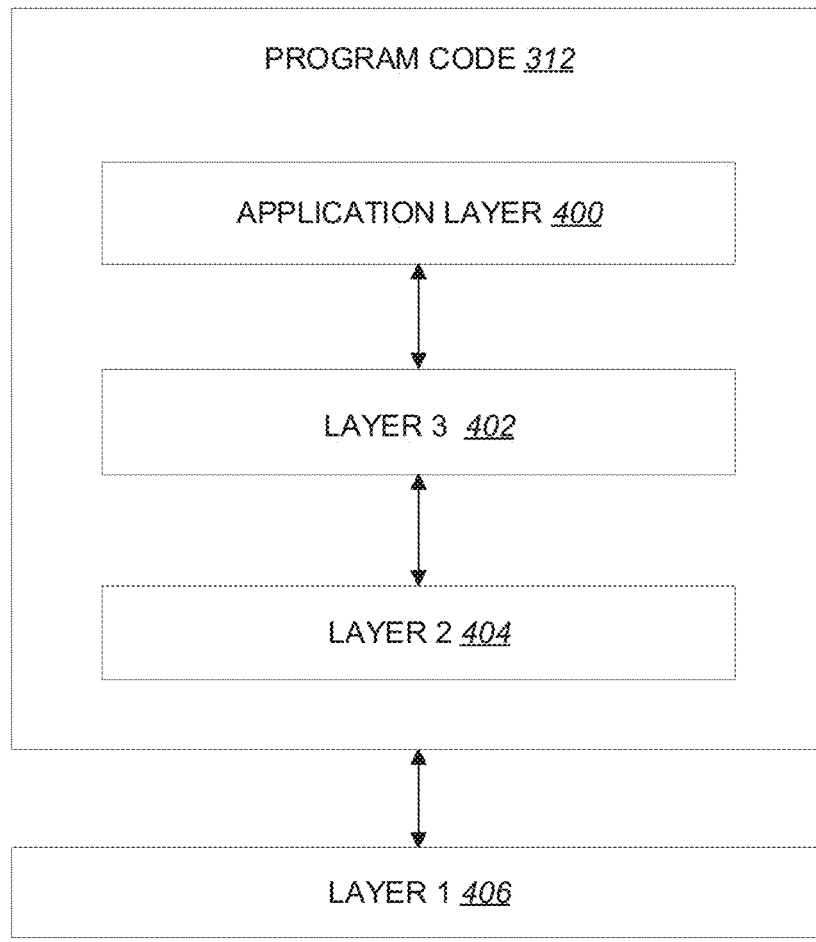
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 5:
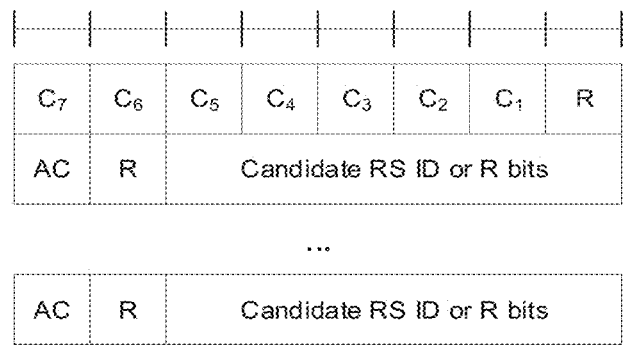
FIG. 5 is a diagram illustrating a Secondary Cell (SCell) beam failure recovery Medium Access Control (MAC) Control Element (CE) (BFR MAC CE) and/or a truncated SCell BFR MAC CE according to one exemplary embodiment.
Figure 6:
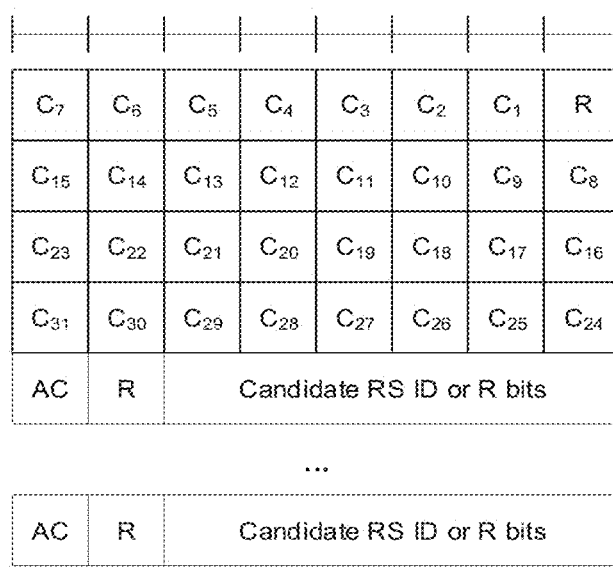
FIG. 6 is a diagram illustrating a SCell BFR MAC CE and/or a truncated SCell BFR MAC CE according to one exemplary embodiment.
Figures 7, 8:
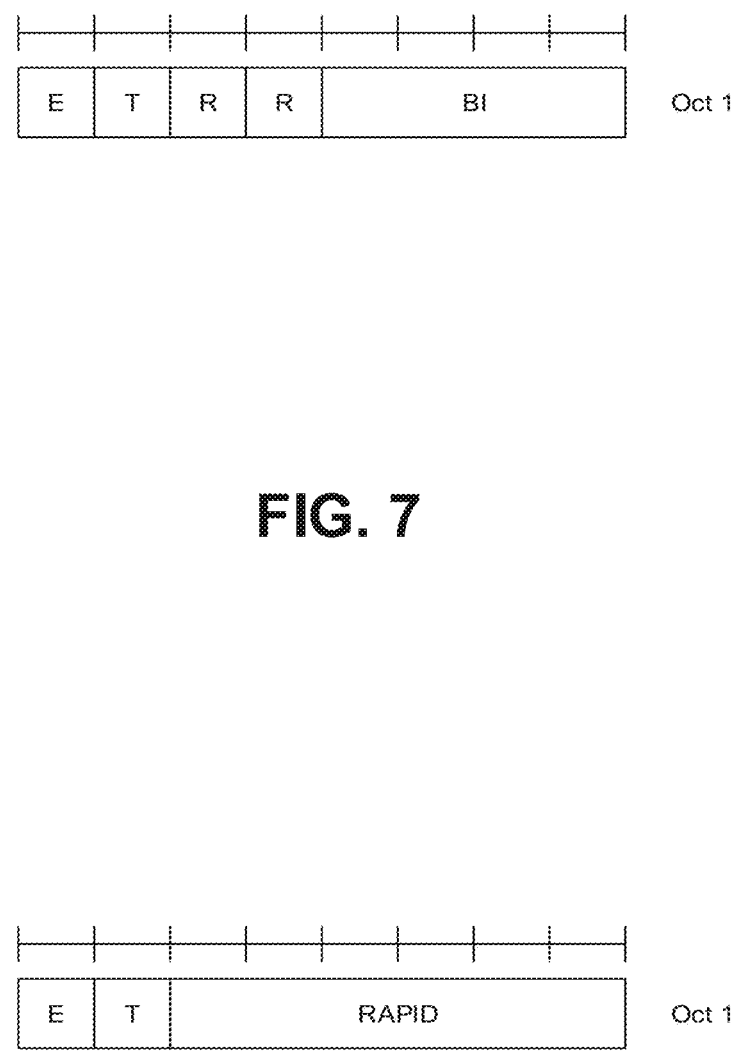
Figure 9:
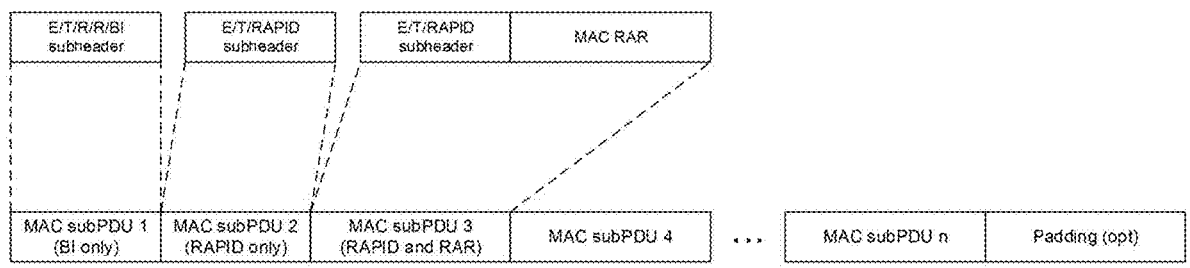
FIG. 9 is a diagram illustrating a MAC Protocol Data Unit (PDU) according to one exemplary embodiment.

In 3GPP specification 38.321 16.0.0, random access procedure and beam failure recovery procedure for Primary Cell (PCell) and Secondary Cell (SCell) is introduced. Notably, FIG. 6.1.3.23-1 of Section 6.1.3.23 of 3GPP specification 38.321 16.0.0, entitled "SCell BFR and Truncated SCell BFR MAC CE with the highest ServCellIndex of this MAC entity's SCell configured with BFD is less than 8", is reproduced herein as FIG. 5. FIG. 6.1.3.23-2 of Section 6.1.3.23 of 3GPP specification 38.321 16.0.0, entitled "SCell BFR and Truncated SCell BFR MAC CE with the highest ServCellIndex of this MAC entity's SCell configured with BFD is equal to or higher than 8", is reproduced herein as FIG. 6. FIG. 6.1.5-1 of Section 6.1.5 of 3GPP specification 38.321 16.0.0, entitled "E/T/R/R/BI MAC subheader", is reproduced herein as FIG. 7. FIG. 6.1.5-2 of Section 6.1.5 of 3GPP specification 38.321 16.0.0, entitled "E/T/RAPID MAC subheader", is reproduced herein as FIG. 8. FIG. 6.1.5-3 of Section 6.1.5 of 3GPP specification 38.321 16.0.0, entitled "Example of MAC PDU consisting of MAC RARs", is reproduced herein as FIG. 9. Parts of 3GPP specification 38.321 16.0.0 are quoted below:

Msg3: Message transmitted on UL-SCH containing a C-RNTI MAC CE or CCCH SDU, submitted from upper layer and associated with the UE Contention Resolution Identity, as part of a Random Access procedure.

Serving Cell: A PCell, a PSCell, or an SCell in TS 38.331 [5].

Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.

5 MAC Procedures 5.1 Random Access Procedure 5.1.1 Random Access Procedure Initialization The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

NOTE 1: If a new Random Access procedure is triggered while another is already ongoing in the MAC entity, it is up to UE implementation whether to continue with the ongoing procedure or start with the new procedure (e.g. for SI request).

NOTE 2: If there was an ongoing Random Access procedure that is triggered by a PDCCH order while the UE receives another PDCCH order indicating the same Random Access Preamble, PRACH mask index and uplink carrier, the Random Access procedure is considered as the same Random Access procedure as the ongoing one and not initialized again.

RRC configures the following parameters for the Random Access procedure:

prach-ConfigurationIndex: the available set of PRACH occasions for the transmission of the Random Access Preamble for Msg1. These are also applicable to the MSGA PRACH if the PRACH occasions are shared between 2-step and 4-step RA types;

msgA-prach-ConfigurationIndex: the available set of PRACH occasions for the transmission of the Random Access Preamble for MSGA in 2-step RA type;

preambleReceivedTargetPower: initial Random Access Preamble power;

rsrp-ThresholdSSB: an RSRP threshold for the selection of the SSB for 4-step RA type. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS for 4-step RA type. If the Random Access procedure is initiated for beam failure recovery, rsrp-ThresholdCSI-RS is equal to rsrp-ThresholdSSB in BeamFailureRecoveryConfig IE;

msgA-RSRP-ThresholdSSB: an RSRP threshold for the selection of the SSB for 2-step RA type. If the Random Access procedure is initiated for beam failure recovery, msgA-RSRP-ThresholdSSB used for the selection of the SSB within candidateBeamRSList refers to msgA-RSRP-ThresholdSSB in BeamFailureRecoveryConfig IE;

msgA-RSRP-ThresholdCSI-RS: an RSRP threshold for the selection of CSI-RS for 2-step RA type. If the Random Access procedure is initiated for beam failure recovery, msgA-RSRP-ThresholdCSI-RS is equal to msgA-RSRP-ThresholdSSB in BeamFailureRecoveryConfig IE;

rsrp-ThresholdSSB-SUL: an RSRP threshold for the selection between the NUL carrier and the SUL carrier;

msgA-RSRP-Threshold: an RSRP threshold for selection between 2-step RA type and 4-step RA type when both 2-step and 4-step RA type Random Access Resources are configured in the UL BWP for NUL;

msgA-RSRP-ThresholdSUL: an RSRP threshold for selection between 2-step RA type and 4-step RA type when both 2-step and 4-step RA type Random Access Resources are configured in the UL BWP for SUL;

msgA-TransMax: The maximum number of MSGA transmissions when both 4-step and 2-step RA type Random Access Resources are configured;

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

msgA-PreamblePowerRampingStep: the power ramping factor for MSGA preamble;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see clause 7.4);

msgA-SSB-SharedRO-MaskIndex: Indicates the subset of 4-step RA type PRACH occasions shared with 2-step RA type PRACH occasions for each SSB. If 2-step RA type PRACH occasions are shared with 4-step RA type PRACH occasions and msgA-SSB-SharedRO-MaskIndex is not configured, then all 4-step RA type PRACH occasions are available for 2-step RA type (see clause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion for 4-step RA type and the number of contention-based Random Access Preambles mapped to each SSB;

msgA-SSB-PerRACH-OccasionAndCB-PreamblesPerSSB: defines the number of SSBs mapped to each PRACH occasion for 2-step RA type and the number of contention-based Random Access Preambles mapped to each SSB;

if groupBconfigured is configured, then Random Access Preambles group B is configured for 4-step RA type.

Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

if groupB-ConfiguredTwoStepRA is configured, then Random Access Preambles group B is configured for 2-step RA type.

Amongst the contention-based Random Access Preambles for 2-step RA type associated with an SSB (as defined in TS 38.213 [6]), the first msgA-numberOfRA-PreamblesGroupA Random Access Preambles belong to Random Access Preambles group A. The remaining Random Access Preambles associated with the SSB belong to Random Access Preambles group B (if configured).

NOTE 2: If Random Access Preambles group B is supported by the cell Random Access Preambles group B is included for each SSB.

if Random Access Preambles group B is configured for 4-step RA type:

ra-Msg3SizeGroupA: the threshold to determine the groups of Random Access Preambles for 4-step RA type;

msg3-DeltaPreamble: $\Delta_{PREAMBLE\text{-}Msg3}$ in TS 38.213 [6];

messagePowerOffsetGroupB: the power offset for preamble selection;

numberOfRA-PreamblesGroupA: defines the number of Random Access Preambles in Random Access Preamble group A for each SSB.

if Random Access Preambles group B is configured for 2-step RA type:

msgA-DeltaPreamble: $\Delta_{PREAMBLE\text{-}MsgA}$ in TS 38.213 [6];

msgA-messagePowerOffsetGroupB: the power offset for preamble selection configured as messagePowerOffsetGroupB included in GroupB-ConfiguredTwoStepRA;

msgA-numberOfRA-PreamblesGroupA: defines the number of Random Access Preambles in Random Access Preamble group A for each SSB configured as numberofRA-PreamblesGroupA in GroupB-ConfiguredTwoStepRA.

ra-MsgASizeGroupA: the threshold to determine the groups of Random Access Preambles for 2-step RA type.

the set of Random Access Preambles and/or PRACH occasions for SI request, if any;

the set of Random Access Preambles and/or PRACH occasions for beam failure recovery request, if any;

the set of Random Access Preambles and/or PRACH occasions for reconfiguration with sync, if any;

ra-ResponseWindow: the time window to monitor RA response(s) (SpCell only);

ra-ContentionResolutionTimer: the Contention Resolution Timer (SpCell only);

msgB-ResponseWindow: the time window to monitor RA response(s) for 2-step RA type (SpCell only).

In addition, the following information for related Serving Cell is assumed to be available for UEs:

if Random Access Preambles group B is configured:

if the Serving Cell for the Random Access procedure is configured with supplementary uplink as specified in TS 38.331 [5], and SUL carrier is selected for performing Random Access Procedure:

$P_{CMAX,f,c}$ of the SUL carrier as specified in TS 38.101-1 [14], TS 38.101-2 [15], and TS 38.101-3 [16].

else:

$P_{CMAX,f,c}$ of the NUL carrier as specified in TS 38.101-1 [14], TS 38.101-2 [15], and TS 38.101-3 [16].

The following UE variables are used for the Random Access procedure:

PREAMBLE_INDEX;
PREAMBLE_TRANSMISSION_COUNTER;
PREAMBLE_POWER_RAMPING_COUNTER;
PREAMBLE_POWER_RAMPING_STEP;
PREAMBLE_RECEIVED_TARGET_POWER;
PREAMBLE_BACKOFF;
PCMAX;
SCALING_FACTOR_BI;
TEMPORARY_C-RNTI;
RA_TYPE;
POWER_OFFSET_2STEP_RA;
MSGA_PREAMBLE_POWER_RAMPING_STEP;
RSRP_THRESHOLD_RA_TYPE_SELECTION.

When the Random Access procedure is initiated on a Serving Cell, the MAC entity shall:

1> flush the Msg3 buffer;
1> flush the MSGA buffer;
1> set the PREAMBLE_TRANSMISSION_COUNTER to 1;

1>set the PREAMBLE_POWER_RAMPING_COUNTER to 1;
1>set the PREAMBLE_BACKOFF to 0 ms;
1>set POWER_OFFSET 2STEP_RA to 0 dB;
1>if the carrier to use for the Random Access procedure is explicitly signalled:
  2>select the signalled carrier for performing Random Access procedure;
  2>set the PCMAX to $P_{CMAX,f,c}$ of the signalled carrier.
1>else if the carrier to use for the Random Access procedure is not explicitly signalled; and
1>if the Serving Cell for the Random Access procedure is configured with supplementary uplink as specified in TS 38.331 [5]; and
1>if the RSRP of the downlink pathloss reference is less than rsrp-ThresholdSSB-SUL:
  2>select the SUL carrier for performing Random Access procedure;
  2>set the PCMAX to $P_{CMAX,f,c}$ of the SUL carrier;
  2>set the RSRP_THRESHOLD_RA_TYPE_SELECTION to msgA-RSRP-ThresholdSUL.
1>else:
  2>select the NUL carrier for performing Random Access procedure;
  2>set the PCMAX to $P_{CMAX,f,c}$ of the NUL carrier;
  2>set the RSRP_THRESHOLD_RA_TYPE_SELECTION to msgA-RSRP-Threshold.
1>perform the BWP operation as specified in clause 5.15;
1>if the Random Access procedure is initiated by PDCCH order and if the ra-PreambleIndex explicitly provided by PDCCH is not 0b000000; or
1>if the Random Access procedure was initiated for SI request (as specified in TS 38.331 [5]) and the Random Access Resources for SI request have been explicitly provided by RRC; or
1>if the Random Access procedure was initiated for beam failure recovery (as specified in clause 5.17) and if the contention-free Random Access Resources for beam failure recovery request for 4-step RA type have been explicitly provided by RRC for the BWP selected for Random Access procedure; or
1>if the Random Access procedure was initiated for reconfiguration with sync and if the contention-free Random Access Resources for 4-step RA type have been explicitly provided in rach-ConfigDedicated for the BWP selected for Random Access procedure:
  2>set the RA_TYPE to 4-stepRA.
1>else if the BWP selected for Random Access procedure is configured with both 2-step and 4-step RA type Random Access Resources and the RSRP of the downlink pathloss reference is above RSRP_THRESHOLD_RA_TYPE_SELECTION; or
1>if the BWP selected for Random Access procedure is only configured with 2-step RA type Random Access resources (i.e. no 4-step RACH RA type resources configured); or
1>if the Random Access procedure was initiated for reconfiguration with sync and if the contention-free Random Access Resources for 2-step RA type have been explicitly provided in rach-ConfigDedicated for the BWP selected for Random Access procedure:
  2>set the RA_TYPE to 2-stepRA.
1>else:
  2>set the RA_TYPE to 4-stepRA.
1>perform initialization of variables specific to Random Access type as specified in clause 5.1.1a; 1>if RA_TYPE is set to 2-stepRA:
  2>perform the Random Access Resource selection procedure for 2-step RA type (see clause 5.1.2a).
1>else:
  2>perform the Random Access Resource selection procedure (see clause 5.1.2).

5.1.1a Initialization of Variables Specific to Random Access Type

The MAC entity shall:
1>if RA_TYPE is set to 2-stepRA:
  2>set PREAMBLE_POWER_RAMPING_STEP to msgA-PreamblePowerRampingStep;
  2>set SCALING_FACTOR_BI to 1;
  2>set preambleTransMax to preambleTransMax included in the RACH-ConfigGenericTwoStepRA;
  2>if the Random Access procedure was initiated for beam failure recovery (as specified in clause 5.17); and
  2>if beamFailureRecoveryConfig is configured for the active UL BWP of the selected carrier:
    3>if ra-PrioritizationTwoStep is configured in the beamFailureRecoveryConfig:
      4>set PREAMBLE_POWER_RAMPING_STEP to the powerRampingStepHighPriority included in the ra-PrioritizationTwoStep in beamFailureRecoveryConfig.
      4>if scalingFactorBI is configured in the ra-PrioritizationTwoStep in beamFailureRecoveryConfig:
        5>set SCALING_FACTOR_BI to the scalingFactorBI.
  2>else if the Random Access procedure was initiated for handover; and
  2>if rach-ConfigDedicated is configured for the selected carrier:
    3>if ra-PrioritizationTwoStep is configured in the rach-ConfigDedicated:
      4>set PREAMBLE_POWER_RAMPING_STEP to the powerRampingStepHighPriority included in the ra-PrioritizationTwoStep in rach-ConfigDedicated.
      4>if scalingFactorBI is configured in ra-PrioritizationTwoStep in the rach-ConfigDedicated:
        5>set SCALING_FACTOR_BI to the scalingFactorBI.
  2>if ra-PrioritizationForAccessIdentityTwoStep is configured for the selected carrier; and
  2>if one or more Access Identities has been explicitly provided by RRC; and
  2>if for at least one of these Access Identities the corresponding bit in the ra-PriorizationForAI is set to one:
    3>if powerRampingStepHighPriority is configured in the ra-PrioritizationForAccessIdentityTwoStep:
      4>set PREAMBLE_POWER_RAMPING_STEP to the powerRampingStepHighPriority.
    3>if scalingFactorBI is configured in the ra-PrioritizationForAccessIdentityTwoStep:
      4>set SCALING_FACTOR_BI to the scalingFactorBI.
  2>set MSGA_PREAMBLE_POWER_RAMPING_STEP to PREAMBLE_POWER_RAMPING_STEP.

1>else (i.e. RA_TYPE is set to 4-stepRA):
  2>set PREAMBLE_POWER_RAMPING_STEP to powerRampingStep;
  2>set SCALING_FACTOR_BI to 1;
  2>set preambleTransMax to preambleTransMax included in the RACH-ConfigGeneric;
  2>if the Random Access procedure was initiated for SpCell beam failure recovery (as specified in clause 5.17); and
  2>if beamFailureRecoveryConfig is configured for the active UL BWP of the selected carrier:
    3>start the beamFailureRecovetyTimer, if configured;
    3>apply the parameters powerRampingStep, preambleReceivedTargetPower, and preambleTransMax configured in the beamFailureRecoveryConfig;
    3>if powerRampingStepHighPriority is configured in the beamFailureRecoveryConfig:
      4>set PREAMBLE_POWER_RAMPING_STEP to the powerRampingStepHighPriority.
    3>else:
      4>set PREAMBLE_POWER_RAMPING_STEP to powerRampingStep.
    3>if scalingFactorBI is configured in the beamFailureRecoveryConfig:
      4>set SCALING_FACTOR_BI to the scalingFactorBI.
  2>else if the Random Access procedure was initiated for handover; and
  2>if rach-ConfigDedicated is configured for the selected carrier:
    3>if powerRampingStepHighPriority is configured in the rach-ConfigDedicated:
      4>set PREAMBLE_POWER_RAMPING_STEP to the powerRampingStepHighPriority.
    3>if scalingFactorBI is configured in the rach-ConfigDedicated:
      4>set SCALING_FACTOR_BI to the scalingFactorBI.
  2>if ra-PrioritizationForAccessIdentity is configured for the selected carrier; and
  2>if one or more Access Identities has been explicitly provided by RRC; and
  2>if for at least one of these Access Identities the corresponding bit in the ra-PriorizationForAI is set to one:
    3>if powerRampingStepHighPriority is configured in the ra-PrioritizationForAccessIdentity:
      4>set PREAMBLE_POWER_RAMPING_STEP to the powerRampingStepHighPriority.
    3>if scalingFactorBI is configured in the ra-PrioritizationForAccessIdentity:
      4>set SCALING_FACTOR_BI to the scalingFactorBI.
  2>if RA_TYPE is switched from 2-stepRA to 4-step RA during this Random Access procedure:
    3>set POWER_OFFSET 2STEP_RA to (PREAMBLE_POWER_RAMPING_COUNTER−1)× (MSGA_PREAMBLE_POWER_RAMPING_STEP−PREAMBLE_POWER_RAMPING).

5.1.2 Random Access Resource Selection

If the selected RA_TYPE is set to 4-stepRA, the MAC entity shall:
1>if the Random Access procedure was initiated for SpCell beam failure recovery (as specified in clause 5.17); and
1>if the beamFailureRecoveryTimer (in clause 5.17) is either running or not configured; and
1>if the contention-free Random Access Resources for beam failure recovery request associated with any of the SSBs and/or CSI-RSs have been explicitly provided by RRC; and
1>if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
  2>select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
  2>if CSI-RS is selected, and there is no ra-PreambleIndex associated with the selected CSI-RS:
    3>set the PREAMBLE_INDEX to a ra-PreambleIndex corresponding to the SSB in candidateBeamRSList which is quasi-colocated with the selected CSI-RS as specified in TS 38.214 [7].
  2>else:
    3>set the PREAMBLE_INDEX to a ra-PreambleIndex corresponding to the selected SSB or CSI-RS from the set of Random Access Preambles for beam failure recovery request.
1>else if the ra-PreambleIndex has been explicitly provided by PDCCH; and
1>if the ra-PreambleIndex is not 0b000000:
  2>set the PREAMBLE_INDEX to the signalled ra-PreambleIndex;
  2>select the SSB signalled by PDCCH.
1>else if the contention-free Random Access Resources associated with SSBs have been explicitly provided in rach-ConfigDedicated and at least one SSB with SS-RSRP above rsrp-ThresholdSSB amongst the associated SSBs is available:
  2>select an SSB with SS-RSRP above rsrp-ThresholdSSB amongst the associated SSBs;
  2>set the PREAMBLE_INDEX to a ra-PreambleIndex corresponding to the selected SSB.
1>else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
  2>select a CSI-RS with CSI-RSRP above rsrp-ThresholdCSI-RS amongst the associated CSI-RSs;
  2>set the PREAMBLE_INDEX to a ra-PreambleIndex corresponding to the selected CSI-RS.
1>else if the Random Access procedure was initiated for SI request (as specified in TS 38.331 [5]); and
1>if the Random Access Resources for SI request have been explicitly provided by RRC:
  2>if at least one of the SSBs with SS-RSRP above rsrp-ThresholdSSB is available:
    3>select an SSB with SS-RSRP above rsrp-ThresholdSSB.
  2>else:
    3>select any SSB.
  2>select a Random Access Preamble corresponding to the selected SSB, from the Random Access Preamble(s) determined according to ra-PreambleStartIndex as specified in TS 38.331 [5];
  2>set the PREAMBLE_INDEX to selected Random Access Preamble.

1>else (i.e. for the contention-based Random Access preamble selection):
2>if at least one of the SSBs with SS-RSRP above rsrp-ThresholdSSB is available:
3>select an SSB with SS-RSRP above rsrp-ThresholdSSB.
2>else:
3>select any SSB.
2>if the RA_TYPE is switched from 2-stepRA to 4-stepRA:
3>if a Random Access Preambles group was selected during the current Random Access procedure:
4>select the same group of Random Access Preambles as was selected for the 2-step RA type.
3>else:
4>if Random Access Preambles group B is configured; and
4>if the transport block size of the MSGA payload configured in the rach-ConfigDedicated corresponds to the transport block size of the MSGA payload associated with Random Access Preambles group B:
5>select the Random Access Preambles group B.
4>else:
5>select the Random Access Preambles group A.
2>else if Msg3 buffer is empty:
3>if Random Access Preambles group B is configured:
4>if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)–preambleReceivedTargetPower–msg3-DeltaPreamble–messagePowerOffsetGroupB; or
4>if the Random Access procedure was initiated for the CCCH logical channel and the CCCH SDU size plus MAC subheader is greater than ra-Msg3SizeGroupA:
5>select the Random Access Preambles group B.
4>else:
5>select the Random Access Preambles group A.
3>else:
4>select the Random Access Preambles group A.
2>else (i.e. Msg3 is being retransmitted):
3>select the same group of Random Access Preambles as was used for the Random Access Preamble transmission attempt corresponding to the first transmission of Msg3.
2>select a Random Access Preamble randomly with equal probability from the Random Access Preambles associated with the selected SSB and the selected Random Access Preambles group.
2>set the PREAMBLE_INDEX to the selected Random Access Preamble.
1>if the Random Access procedure was initiated for SI request (as specified in TS 38.331 [5]); and
1>if ra-AssociationPeriodIndex and si-RequestPeriod are configured:
2>determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).
1>else if an SSB is selected above:
2>determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1>else if a CSI-RS is selected above:
2>if there is no contention-free Random Access Resource associated with the selected CSI-RS:
3>determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
2>else:
3>determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1>perform the Random Access Preamble transmission procedure (see clause 5.1.3).

NOTE 1: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

NOTE 2: For a UE operating in a semi-static channel access mode as described in TS 37.213 [18], Random Access Resources overlapping with the idle time of a fixed frame period are not considered for selection.

5.1.2a Random Access Resource Selection for 2-Step RA Type

If the selected RA_TYPE is set to 2-stepRA, the MAC entity shall:
1>if the contention-free 2-step RA type Resources associated with SSBs have been explicitly provided in rach-ConfigDedicated and at least one SSB with SS-RSRP above msgA-RSRP-ThresholdSSB amongst the associated SSBs is available:
  2>select an SSB with SS-RSRP above msgA-RSRP-ThresholdSSB amongst the associated SSBs;
  2>set the PREAMBLE_INDEX to a ra-PreambleIndex corresponding to the selected SSB.
1>else if the contention-free 2-step RA type Resources associated with CSI-RSs have been explicitly provided in rach-ConfigDedicated and at least one CSI-RS with CSI-RSRP above msgA-RSRP-ThresholdCSI-RS amongst the associated CSI-RSs is available:
  2>select a CSI-RS with CSI-RSRP above msgA-RSRP-ThresholdCSI-RS amongst the associated CSI-RSs;
  2>set the PREAMBLE_INDEX to a ra-PreambleIndex corresponding to the selected CSI-RS.
1>else (i.e. for the contention-based Random Access Preamble selection):
  2>if at least one of the SSBs with SS-RSRP above msgA-RSRP-ThresholdSSB is available:
    3>select an SSB with SS-RSRP above msgA-RSRP-ThresholdSSB.
  2>else:
    3>select any SSB.
  2>if contention-free Random Access Resources for 2-step RA type have not been configured and if Random Access Preambles group has not yet been selected during the current Random Access procedure:
    3>if Random Access Preambles group B for 2-step RA type is configured:
      4>if the potential MSGA payload size (UL data available for transmission plus MAC header and, where required, MAC CEs) is greater than the ra-MsgASizeGroupA and the pathloss is less than PCMAX (of the Serving Cell performing the Random Access Procedure)−msgA-PreambleReceivedTargetPower−msgA-DeltaPreamble−msgA-messagePowerOffsetGroupB; or
      4>if the Random Access procedure was initiated for the CCCH logical channel and the CCCH SDU size plus MAC subheader is greater than ra-MsgASizeGroupA:
        5>select the Random Access Preambles group B.
      4>else:
        5>select the Random Access Preambles group A.
    3>else:
      4>select the Random Access Preambles group A.
  2>else if contention-free Random Access Resources for 2-step RA type have been configured and if Random Access Preambles group has not yet been selected during the current Random Access procedure:
    3>if Random Access Preambles group B for 2-step RA type is configured; and
    3>if the transport block size of the MSGA payload configured in the rach-ConfigDedicated corresponds to the transport block size of the MSGA payload associated with Random Access Preambles group B:
      4>select the Random Access Preambles group B.
    3>else:
      4>select the Random Access Preambles group A.
  2>else (i.e. Random Access preambles group has been selected during the current Random Access procedure):
    3>select the same group of Random Access Preambles as was used for the Random Access Preamble transmission attempt corresponding to the earlier transmission of MSGA.
  2>select a Random Access Preamble randomly with equal probability from the 2-step RA type Random Access Preambles associated with the selected SSB and the selected Random Access Preambles group;
  2>set the PREAMBLE_INDEX to the selected Random Access Preamble;
1>determine the next available PRACH occasion from the PRACH occasions corresponding to the selected SSB permitted by the restrictions given by the msgA-SSB-SharedRO-MaskIndex if configured and ra-ssb-OccasionMaskIndex if configured (the MAC entity shall select a PRACH occasion randomly with equal probability among the consecutive PRACH occasions allocated for
  2-step RA type according to clause 8.1 of TS 38.213 [6], corresponding to the selected SSB; the MAC entity may take into account the possible occurrence of measurement gaps when determining the next available PRACH occasion corresponding to the selected SSB);
1>determine the UL grant and the associated HARQ information for the PUSCH resource of MSGA associated with the selected preamble and PRACH occasion according to clause 8.1A of TS 38.213 [6];
1>deliver the UL grant and the associated HARQ information to the HARQ entity; 1>perform the MSGA transmission procedure (see clause 5.1.3a).
NOTE: To determine if there is an SSB with SS-RSRP above msgA-RSRP-ThresholdSSB, the UE uses the latest unfiltered L1-RSRP measurement.
5.1.3 Random Access Preamble Transmission
The MAC entity shall, for each Random Access Preamble:
1>if PREAMBLE_TRANSMISSION_COUNTER is greater than one; and
1>if the notification of suspending power ramping counter has not been received from lower layers; and
1>if LBT failure indication was not received from lower layers for the last Random Access Preamble transmission; and
1>if SSB or CSI-RS selected is not changed from the selection in the last Random Access Preamble transmission:
  2>increment PREAMBLE_POWER_RAMPING_COUNTER by 1.
1>select the value of DELTA_PREAMBLE according to clause 7.3;
1>set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;
1>except for contention-free Random Access Preamble for beam failure recovery request, compute the RA-RNTI associated with the PRACH occasion in which the Random Access Preamble is transmitted;
1>instruct the physical layer to transmit the Random Access Preamble using the selected PRACH occasion, corresponding RA-RNTI (if available), PREAMBLE_INDEX and PREAMBLE_RECEIVED_TARGET_POWER.
1>if LBT failure indication is received from lower layers for this Random Access Preamble transmission:
  2>perform the Random Access Resource selection procedure (see clause 5.1.2).

The RA-RNTI associated with the PRACH occasion in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0<t_id<80), where the subcarrier spacing to determine t_id is based on the value of μ specified in clause 5.3.2 in TS 38.211 [8], f_id is the index of the PRACH occasion in the frequency domain (0<f_id<8), and ul_carrier_id is the UL carrier used for Random Access Preamble transmission (0 for NUL carrier, and 1 for SUL carrier).

5.1.3a MSGA Transmission

The MAC entity shall, for each MSGA:
1>if PREAMBLE_TRANSMISSION_COUNTER is greater than one; and
1>if the notification of suspending power ramping counter has not been received from lower layers; and
1>if LBT failure indication was not received from lower layers for the last MSGA Random Access Preamble transmission; and
1>if SSB or CSI-RS selected is not changed from the selection in the last Random Access Preamble transmission:
  2>increment PREAMBLE_POWER_RAMPING_COUNTER by 1.
1>select the value of DELTA_PREAMBLE according to clause 7.3;
1>set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
1>if this is the first MSGA transmission within this Random Access procedure:
  2>if the transmission is not being made for the CCCH logical channel:
    3>indicate to the Multiplexing and assembly entity to include a C-RNTI MAC CE in the subsequent uplink transmission.
  2>obtain the MAC PDU to transmit from the Multiplexing and assembly entity and store it in the MSGA buffer.
1>compute the MSGB-RNTI associated with the PRACH occasion in which the Random Access Preamble is transmitted;
1>instruct the physical layer to transmit the MSGA using the selected PRACH occasion and the associated PUSCH resource, using the corresponding RA-RNTI, MSGB-RNTI, PREAMBLE_INDEX, PREAMBLE_RECEIVED_TARGET_POWER, preambleReceivedTargetPower, and the amount of power ramping applied to the latest MSGA preamble transmission (i.e. (PREAMBLE_POWER_RAMPING_COUNTER−1)× PREAMBLE_POWER_RAMPING_STEP);
1>if LBT failure indication is received from lower layers for the transmission of this MSGA Random Access Preamble:
  2>instruct the physical layer to cancel the transmission of the MSGA payload on the associated PUSCH resource;
  2>perform the Random Access Resource selection procedure for 2-step RA type (see clause 5.1.2a).

NOTE: The MSGA transmission includes the transmission of the PRACH Preamble as well as the contents of the MSGA buffer in the PUSCH resource corresponding to the selected PRACH occasion and PREAMBLE_INDEX (see TS 38.213 [6])

The MSGB-RNTI associated with the PRACH occasion in which the Random Access Preamble is transmitted, is computed as:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

where s_id is the index of the first OFDM symbol of the PRACH occasion (0≤s_id<14), t_id is the index of the first slot of the PRACH occasion in a system frame (0<t_id<80), where the subcarrier spacing to determine t_id is based on the value of μ specified in clause 5.3.2 in TS 38.211 [8], f_id is the index of the PRACH occasion in the frequency domain (0≤f_id<8), and ul_carrier_id is the UL carrier used for Random Access Preamble transmission (0 for NUL carrier, and 1 for SUL carrier). The RA-RNTI is calculated as specified in clause 5.1.3.

5.1.4 Random Access Response Reception

Once the Random Access Preamble is transmitted and regardless of the possible occurrence of a measurement gap, the MAC entity shall:
1>if the contention-free Random Access Preamble for beam failure recovery request was transmitted by the MAC entity:
  2>start the ra-Response Window configured in BeamFailureRecoveryConfig at the first PDCCH occasion as specified in TS 38.213 [6] from the end of the Random Access Preamble transmission;
  2>monitor for a PDCCH transmission on the search space indicated by recoverySearchSpaceId of the SpCell identified by the C-RNTI while ra-ResponseWindow is running
1>else:
  2>start the ra-Response Window configured in RACH-ConfigCommon at the first PDCCH occasion as specified in TS 38.213 [6] from the end of the Random Access Preamble transmission;
  2>monitor the PDCCH of the SpCell for Random Access Response(s) identified by the RA-RNTI while the ra-ResponseWindow is running
1>if notification of a reception of a PDCCH transmission on the search space indicated by recoverySearchSpaceId is received from lower layers on the Serving Cell where the preamble was transmitted; and
1>if PDCCH transmission is addressed to the C-RNTI; and
1>if the contention-free Random Access Preamble for beam failure recovery request was transmitted by the MAC entity:
  2>consider the Random Access procedure successfully completed.
1>else if a valid (as specified in TS 38.213 [6]) downlink assignment has been received on the PDCCH for the RA-RNTI and the received TB is successfully decoded:

2>if the Random Access Response contains a MAC subPDU with Backoff Indicator:
   3>set the PREAMBLE_BACKOFF to value of the BI field of the MAC subPDU using Table 7.2-1, multiplied with SCALING_FACTOR_BI.
2>else:
   3>set the PREAMBLE_BACKOFF to 0 ms.
2>if the Random Access Response contains a MAC subPDU with Random Access Preamble identifier corresponding to the transmitted PREAMBLE_INDEX (see clause 5.1.3):
   3>consider this Random Access Response reception successful.
2>if the Random Access Response reception is considered successful:
   3>if the Random Access Response includes a MAC subPDU with RAPID only:
      4>consider this Random Access procedure successfully completed;
      4>indicate the reception of an acknowledgement for SI request to upper layers.
   3>else:
      4>apply the following actions for the Serving Cell where the Random Access Preamble was transmitted:
         5>process the received Timing Advance Command (see clause 5.2);
         5>indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
         5>if the Random Access procedure for an SCell is performed on uplink carrier where pusch-Config is not configured:
            6>ignore the received UL grant.
         5>else:
            6>process the received UL grant value and indicate it to the lower layers.
      4>if the Random Access Preamble was not selected by the MAC entity among the contention-based Random Access Preamble(s):
         5>consider the Random Access procedure successfully completed.
      4>else:
         5>set the TEMPORARY C-RNTI to the value received in the Random Access Response;
         5>if this is the first successfully received Random Access Response within this Random Access procedure:
            6>if the transmission is not being made for the CCCH logical channel:
               7>indicate to the Multiplexing and assembly entity to include a C-RNTI MAC CE in the subsequent uplink transmission.
            6>obtain the MAC PDU to transmit from the Multiplexing and assembly entity and store it in the Msg3 buffer.
NOTE: If within a Random Access procedure, an uplink grant provided in the Random Access Response for the same group of contention-based Random Access Preambles has a different size than the first uplink grant allocated during that Random Access procedure, the UE behavior is not defined.
1>if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or
1>if ra-Response Window configured in RACH-ConfigCommon expires, and if the Random Access Response containing Random Access Preamble identifiers that matches the transmitted PREAMBLE_INDEX has not been received:
   2>consider the Random Access Response reception not successful;
   2>increment PREAMBLE_TRANSMISSION_COUNTER by 1;
   2>if PREAMBLE_TRANSMISSION_COUNTER= preambleTransMax+1:
      3>if the Random Access Preamble is transmitted on the SpCell:
         4>indicate a Random Access problem to upper layers;
         4>if this Random Access procedure was triggered for SI request:
            5>consider the Random Access procedure unsuccessfully completed.
      3>else if the Random Access Preamble is transmitted on an SCell:
         4>consider the Random Access procedure unsuccessfully completed.
   2>if the Random Access procedure is not completed:
      3>select a random backoff time according to a uniform distribution between 0 and the PREAMBLE_BACKOFF;
      3>if the criteria (as defined in clause 5.1.2) to select contention-free Random Access Resources is met during the backoff time:
         4>perform the Random Access Resource selection procedure (see clause 5.1.2);
      3>else if the Random Access procedure for an SCell is performed on uplink carrier where pusch-Config is not configured:
         4>delay the subsequent Random Access transmission until the Random Access Procedure is triggered by a PDCCH order with the same ra-PreambleIndex, ra-ssb-OccasionMaskIndex and UL/SUL indicator TS 38.212 [9].
      3>else:
         4>perform the Random Access Resource selection procedure (see clause 5.1.2) after the backoff time.

The MAC entity may stop ra-ResponseWindow (and hence monitoring for Random Access Response(s)) after successful reception of a Random Access Response containing Random Access Preamble identifiers that matches the transmitted PREAMBLE_INDEX.

HARQ operation is not applicable to the Random Access Response reception.

5.1.4a MSGB Reception and Contention Resolution for 2-Step RA Type

Once the MSGA preamble is transmitted, regardless of the possible occurrence of a measurement gap, the MAC entity shall:
1>start the msgB-ResponseWindow at the first PDCCH occasion from the end of the MSGA transmission as specified in TS 38.213 [6];
1>monitor the PDCCH of the SpCell for a Random Access Response identified by MSGB-RNTI while the msgB-Response Window is running;

1>if C-RNTI MAC CE was included in the MSGA:
  2>monitor the PDCCH of the SpCell for Random Access Response identified by the C-RNTI while the msgB-Response Window is running;
1>if notification of a reception of a PDCCH transmission of the SpCell is received from lower layers:
  2>if the C-RNTI MAC CE was included in MSGA:
    3>if the Random Access procedure was initiated for beam failure recovery (as specified in clause 5.17) and the PDCCH transmission is addressed to the C-RNTI:
      4>consider this Random Access Response reception successful;
      4>stop the msgB-ResponseWindow;
      4>consider this Random Access procedure successfully completed.
    3>else if the timeAlignmentTimer associated with the PTAG is running:
      4>if the PDCCH transmission is addressed to the C-RNTI and contains a UL grant for a new transmission:
        5>consider this Random Access Response reception successful;
        5>stop the msgB-ResponseWindow;
        5>consider this Random Access procedure successfully completed.
    3>else:
      4>if a downlink assignment has been received on the PDCCH for the C-RNTI and the received TB is successfully decoded:
        5>if the MAC PDU contains the Absolute Timing Advance Command MAC CE subPDU:
          6>process the received Timing Advance Command (see clause 5.2);
        6>consider this Random Access Response reception successful;
        6>stop the msgB-ResponseWindow;
        6>consider this Random Access procedure successfully completed and finish the disassembly and demultiplexing of the MAC PDU.
  2>if a downlink assignment has been received on the PDCCH for the MSGB-RNTI and it includes the two LSB bits of the SFN corresponding to the PRACH occasion used to transmit the Random Access Preamble of MSGA and the received TB is successfully decoded:
    3>if the MSGB contains a MAC subPDU with Backoff Indicator:
      4>set the PREAMBLE_BACKOFF to value of the BI field of the MAC subPDU using Table 7.2-1, multiplied with SCALING_FACTOR_BI.
    3>else:
      4>set the PREAMBLE_BACKOFF to 0 ms.
    3>if the MSGB contains a fallbackRAR MAC subPDU; and
    3>if the Random Access Preamble identifier in the MAC subPDU matches the transmitted PREAMBLE_INDEX (see clause 5.1.3a):
      4>consider this Random Access Response reception successful;
      4>apply the following actions for the SpCell:
        5>process the received Timing Advance Command (see clause 5.2);
        5>indicate the preambleReceivedTargetPower and the amount of power ramping applied to the latest Random Access Preamble transmission to lower layers (i.e. (PREAMBLE_POWER_RAMPING_COUNTER–1)×PREAMBLE_POWER_RAMPING_STEP);
        5>if the Random Access Preamble was not selected by the MAC entity among the contention-based Random Access Preamble(s):
          6>consider the Random Access procedure successfully completed.
        5>else:
          6>set the TEMPORARY_C-RNTI to the value received in the Random Access Response;
        5>if the Msg3 buffer is empty:
          6>obtain the MAC PDU to transmit from the MSGA buffer and store it in the Msg3 buffer;
        5>process the received UL grant value and indicate it to the lower layers and proceed with Msg3 transmission;
      NOTE: If within a 2-step RA type procedure, an uplink grant provided in the fallback RAR has a different size than the MSGA payload, the UE behavior is not defined.
    3>else if the MSGB contains a successRAR MAC subPDU; and
    3>if the CCCH SDU was included in the MSGA and the UE Contention Resolution Identity in the MAC subPDU matches the CCCH SDU:
      4>stop msgB-ResponseWindow;
      4>if this Random Access procedure was initiated for SI request:
        5>indicate the reception of an acknowledgement for SI request to upper layers.
      4>else:
        5>set the C-RNTI to the value received in the successRAR;
        5>apply the following actions for the SpCell:
          6>process the received Timing Advance Command (see clause 5.2);
          6>indicate the preambleReceivedTargetPower and the amount of power ramping applied to the latest Random Access Preamble transmission to lower layers (i.e. (PREAMBLE_POWER_RAMPING_COUNTER–1)×PREAMBLE_POWER_RAMPING_STEP);
      4>deliver the TPC, PUCCH resource Indicator and HARQ feedback Timing Indicator received in successRAR to lower layers.
      4>consider this Random Access Response reception successful;
      4>consider this Random Access procedure successfully completed;
      4>finish the disassembly and demultiplexing of the MAC PDU.
1>if msgB-Response Window expires, and the Random Access Response Reception has not been considered as successful based on descriptions above:
  2>increment PREAMBLE_TRANSMISSION_COUNTER by 1;
  2>if PREAMBLE_TRANSMISSION_COUNTER=preambleTransMax+1:
    3>indicate a Random Access problem to upper layers;
    3>if this Random Access procedure was triggered for SI request:
      4>consider this Random Access procedure unsuccessfully completed.

2>if the Random Access procedure is not completed:
 3>if msgA-TransMax is configured and PREAMBLE_TRANSMISSION_COUNTER=msgA-TransMax+1:
  4>set the RA_TYPE to 4-stepRA;
  4>perform initialization of variables specific to Random Access type as specified in clause 5.1.1a;
  4>if the Msg3 buffer is empty:
   5>obtain the MAC PDU to transmit from the MSGA buffer and store it in the Msg3 buffer;
  4>flush HARQ buffer used for the transmission of MAC PDU in the MSGA buffer;
  4>discard explicitly signalled contention-free 2-step RA type Random Access Resources, if any;
  4>perform the Random Access Resource selection procedure as specified in clause 5.1.2.
 3>else:
  4>select a random backoff time according to a uniform distribution between 0 and the PREAMBLE_BACKOFF;
  4>if the criteria (as defined in clause 5.1.2a) to select contention-free Random Access Resources is met during the backoff time:
   5>perform the Random Access Resource selection procedure for 2-step RA type Random Access (see clause 5.1.2a);
  4>else:
   5>perform the Random Access Resource selection procedure for 2-step RA type Random Access (see clause 5.1.2a) after the backoff time.

Upon receiving a fallbackRAR, the MAC entity may stop msgB-ResponseWindow once the Random Access Response reception is considered as successful.

5.1.5 Contention Resolution

Once Msg3 is transmitted, regardless of LBT failure indication from lower layers for Msg3, the MAC entity shall:
1>start the ra-ContentionResolutionTimer and restart the ra-ContentionResolutionTimer at each HARQ retransmission in the first symbol after the end of the Msg3 transmission;
1>monitor the PDCCH while the ra-ContentionResolutionTimer is running regardless of the possible occurrence of a measurement gap;
1>if notification of a reception of a PDCCH transmission of the SpCell is received from lower layers:
 2>if the C-RNTI MAC CE was included in Msg3:
  3>if the Random Access procedure was initiated for beam failure recovery (as specified in clause 5.17) and the PDCCH transmission is addressed to the C-RNTI; or
  3>if the Random Access procedure was initiated by a PDCCH order and the PDCCH transmission is addressed to the C-RNTI; or
  3>if the Random Access procedure was initiated by the MAC sublayer itself or by the RRC sublayer and the PDCCH transmission is addressed to the C-RNTI and contains a UL grant for a new transmission:
   4>consider this Contention Resolution successful;
   4>stop ra-ContentionResolutionTimer;
   4>discard the TEMPORARY C-RNTI;
   4>consider this Random Access procedure successfully completed.
 2>else if the CCCH SDU was included in Msg3 and the PDCCH transmission is addressed to its TEMPORARY C-RNTI:
  3>if the MAC PDU is successfully decoded:
   4>stop ra-ContentionResolutionTimer;
   4>if the MAC PDU contains a UE Contention Resolution Identity MAC CE; and
   4>if the UE Contention Resolution Identity in the MAC CE matches the CCCH SDU transmitted in Msg3:
    5>consider this Contention Resolution successful and finish the disassembly and demultiplexing of the MAC PDU;
    5>if this Random Access procedure was initiated for SI request:
     6>indicate the reception of an acknowledgement for SI request to upper layers.
    5>else:
     6>set the C-RNTI to the value of the TEMPORARY C-RNTI;
    5>discard the TEMPORARY C-RNTI;
    5>consider this Random Access procedure successfully completed.
   4>else:
    5>discard the TEMPORARY C-RNTI;
    5>consider this Contention Resolution not successful and discard the successfully decoded MAC PDU.
1>if ra-ContentionResolutionTimer expires:
 2>discard the TEMPORARY C-RNTI;
 2>consider the Contention Resolution not successful.
1>if the Contention Resolution is considered not successful:
 2>flush the HARQ buffer used for transmission of the MAC PDU in the Msg3 buffer;
 2>increment PREAMBLE_TRANSMISSION_COUNTER by 1;
 2>if PREAMBLE_TRANSMISSION_COUNTER=preambleTransMax+1:
  3>indicate a Random Access problem to upper layers.
  3>if this Random Access procedure was triggered for SI request:
   4>consider the Random Access procedure unsuccessfully completed.
 2>if the Random Access procedure is not completed:
  3>if the RA_TYPE is set to 4-stepRA:
   4>select a random backoff time according to a uniform distribution between 0 and the PREAMBLE_BACKOFF;
   4>if the criteria (as defined in clause 5.1.2) to select contention-free Random Access Resources is met during the backoff time:
    5>perform the Random Access Resource selection procedure (see clause 5.1.2);
   4>else:
    5>perform the Random Access Resource selection procedure (see clause 5.1.2) after the backoff time.
  3>else (i.e. the RA_TYPE is set to 2-stepRA):
   4>if msgA-TransMax is configured and PREAMBLE_TRANSMISSION_COUNTER=msgA-TransMax+1:
    5>set the RA_TYPE to 4-stepRA;
    5>perform initialization of variables specific to Random Access type as specified in clause 5.1.1a;

5>flush HARQ buffer used for the transmission of MAC PDU in the MSGA buffer;
5>discard explicitly signalled contention-free 2-step RA type Random Access Resources, if any;
5>perform the Random Access Resource selection as specified in clause 5.1.2.
4>else:
5>select a random backoff time according to a uniform distribution between 0 and the PREAMBLE_BACKOFF;
5>if the criteria (as defined in clause 5.1.2a) to select contention-free Random Access Resources is met during the backoff time:
6>perform the Random Access Resource selection procedure for 2-step RA type as specified in clause 5.1.2a.
5>else:
6>perform the Random Access Resource selection for 2-step RA type procedure (see clause 5.1.2a) after the backoff time.

5.1.6 Completion of the Random Access Procedure

Upon completion of the Random Access procedure, the MAC entity shall:
1>discard any explicitly signalled contention-free Random Access Resources for 2-step RA type and 4-step RA type except the 4-step RA type contention-free Random Access Resources for beam failure recovery request, if any;
1>flush the HARQ buffer used for transmission of the MAC PDU in the Msg3 buffer and the MSGA buffer;
1>if the Random Access procedure towards target cell for DAPS handover is successfully completed:
2>indicate the successful completion of the Random Access procedure to the upper layers.

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure (see clause 5.21), at most one PUCCH resource for SR is configured per BWP.

Each SR configuration corresponds to one or more logical channels or to SCell beam failure recovery and/or to consistent LBT failure. Each logical channel, and consistent LBT failure, may be mapped to zero or one SR configuration, which is configured by RRC. The SR configuration of the logical channel that triggered a BSR other than Pre-emptive BSR (clause 5.4.5) or the SCell beam failure recovery or the consistent LBT failure (clause 5.21) (if such a configuration exists) is considered as corresponding SR configuration for the triggered SR. Any SR configuration may be used for an SR triggered by Pre-emptive BSR (clause 5.4.5).

RRC configures the following parameters for the scheduling request procedure:
sr-ProhibitTimer (per SR configuration);
sr-TransMax (per SR configuration).

The following UE variables are used for the scheduling request procedure:
SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

Except for SCell beam failure recovery, all pending SR(s) for BSR triggered according to the BSR procedure (clause 5.4.5) prior to the MAC PDU assembly shall be cancelled and each respective sr-ProhibitTimer shall be stopped when the MAC PDU is transmitted, regardless of LBT failure indication from lower layers, and this PDU includes a Long or Short BSR MAC CE which contains buffer status up to (and including) the last event that triggered a BSR (see clause 5.4.5) prior to the MAC PDU assembly. Except for SCell beam failure recovery, all pending SR(s) for BSR triggered according to the BSR procedure (clause 5.4.5) shall be cancelled and each respective sr-ProhibitTimer shall be stopped when the UL grant(s) can accommodate all pending data available for transmission. Pending SR triggered prior to the MAC PDU assembly for beam failure recovery of an SCell shall be cancelled when the MAC PDU is transmitted and this PDU includes an SCell BFR MAC CE or truncated SCell BFR MAC CE which contains beam failure recovery information of that SCell. If all the SR(s) triggered for SCell beam failure recovery are cancelled the MAC entity shall stop sr-ProhibitTimer of corresponding SR configuration.

The MAC entity shall for each pending SR triggered by consistent LBT failure:
1>if a MAC PDU is transmitted, regardless of LBT failure indication from lower layers, and the MAC PDU includes an LBT failure MAC CE that indicates consistent LBT failure for the Serving Cell that triggered this SR; or
1>if the corresponding consistent LBT failure is cancelled (see clause 5.21):
2>cancel the pending SR and stop the corresponding sr-ProhibitTimer.

Only PUCCH resources on a BWP which is active at the time of SR transmission occasion are considered valid.

As long as at least one SR is pending, the MAC entity shall for each pending SR:
1>if the MAC entity has no valid PUCCH resource configured for the pending SR:
2>initiate a Random Access procedure (see clause 5.1) on the SpCell and cancel the pending SR.
1>else, for the SR configuration corresponding to the pending SR:
2>when the MAC entity has an SR transmission occasion on the valid PUCCH resource for SR configured; and
2>if sr-ProhibitTimer is not running at the time of the SR transmission occasion; and
2>if the PUCCH resource for the SR transmission occasion does not overlap with a measurement gap:
3>if the PUCCH resource for the SR transmission occasion overlaps with neither a UL-SCH resource nor an SL-SCH resource; or
3>if the MAC entity is configured with lch-basedPrioritization, and the PUCCH resource for the SR transmission occasion overlaps with any UL-SCH resource(s), and the priority of the logical channel that triggered SR is higher than the priority of the uplink grant(s) for any UL-SCH resource(s) where the priority of the uplink grant is determined as specified in clause 5.4.1; or 3>if a SL-SCH resource overlaps with the PUCCH resource for the SR transmission occasion for the pending SR triggered as specified in clause 5.4.5, and the MAC entity is not able to perform this SR transmission simultaneously with the transmission of the SL-SCH resource, and either transmission on the SL-SCH resource is not prioritized as described in clause 5.22.1.3.1 or the priority value of the logical channel that triggered SR is lower than ul-Prioritizationthres, if configured; or 3>if a SL-SCH resource overlaps with the PUCCH resource for the SR transmission occasion for the pending SR triggered as specified in clause 5.22.1.5, and the MAC entity is not able to perform this SR transmission simultaneously with the transmission of the SL-SCH resource, and the priority of the triggered SR determined as specified in clause 5.22.1.5 is higher than the priority of the MAC PDU determined as specified in clause 5.22.1.3.1 for the SL-SCH resource:

4>the other overlapping uplink grant(s), if any, is a de-prioritized uplink grant;

4>if SR_COUNTER<sr-TransMax:

5>instruct the physical layer to signal the SR on one valid PUCCH resource for SR;

5>if LBT failure indication is not received from lower layers:

5>increment SR_COUNTER by 1;

6>start the sr-ProhibitTimer.

4>else:

5>notify RRC to release PUCCH for all Serving Cells;

5>notify RRC to release SRS for all Serving Cells;

5>clear any configured downlink assignments and uplink grants;

5>clear any PUSCH resources for semi-persistent CSI reporting;

5>initiate a Random Access procedure (see clause 5.1) on the SpCell and cancel all pending SRs.

NOTE 1: Except for SR for SCell beam failure recovery, the selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

NOTE 3: When the MAC entity has pending SR for SCell beam failure recovery and the MAC entity has one or more PUCCH resources overlapping with PUCCH resource for SCell beam failure recovery for the SR transmission occasion, the MAC entity considers only the PUCCH resource for SCell beam failure recovery as valid.

NOTE 4: For a UE operating in a semi-static channel access mode as described in TS 37.213 [18], PUCCH resources overlapping with the idle time of a fixed frame period are not considered valid.

The MAC entity may stop, if any, ongoing Random Access procedure due to a pending SR for BSR which has no valid PUCCH resources configured, which was initiated by MAC entity prior to the MAC PDU assembly. The ongoing Random Access procedure may be stopped when the MAC PDU is transmitted, regardless of LBT failure indication from lower layers, using a UL grant other than a UL grant provided by Random Access Response or a UL grant determined as specified in clause 5.1.2a for the transmission of the MSGA payload, and this PDU includes a BSR MAC CE which contains buffer status up to (and including) the last event that triggered a BSR (see clause 5.4.5) prior to the MAC PDU assembly, or when the UL grant(s) can accommodate all pending data available for transmission.

The ongoing Random Access procedure due to a pending SR for BFR of an SCell may be stopped when the MAC PDU is transmitted using a UL grant other than a UL grant provided by Random Access Response and this PDU contains an SCell BFR MAC CE or truncated SCell BFR MAC CE which includes beam failure recovery information of that SCell.

5.17 Beam Failure Detection and Recovery Procedure

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

RRC configures the following parameters in the BeamFailureRecoveryConfig and the RadioLinkMonitoringConfig for the Beam Failure Detection and Recovery procedure:

beamFailureInstanceMaxCount for the beam failure detection;

beamFailureDetectionTimer for the beam failure detection;

beamFailureRecoveryTimer for the beam failure recovery procedure;

rsrp-ThresholdSSB: an RSRP threshold for the beam failure recovery;

powerRampingStep: powerRampingStep for the beam failure recovery;

powerRampingStepHighPriority: powerRampingStepHighPriority for the beam failure recovery;

preambleReceivedTargetPower: preambleReceivedTargetPower for the beam failure recovery;

preambleTransMax: preambleTransMax for the beam failure recovery;

scalingFactorBI: scalingFactorBI for the beam failure recovery;

ssb-perRACH-Occasion: ssb-perRACH-Occasion for the beam failure recovery;

ra-ResponseWindow: the time window to monitor response(s) for the beam failure recovery using contention-free Random Access Preamble;

prach-ConfigurationIndex: prach-ConfigurationIndex for the beam failure recovery;

ra-ssb-OccasionMaskIndex: ra-ssb-OccasionMaskIndex for the beam failure recovery;

ra-OccasionList: ra-OccasionList for the beam failure recovery.

Editors Note: The specific parameters for SCell BFR will be replicated here after they are settled.

The following UE variables are used for the beam failure detection procedure:

BFI_COUNTER: counter for beam failure instance indication which is initially set to 0.

The MAC entity shall for each Serving Cell configured for beam failure detection:
1> if beam failure instance indication has been received from lower layers:
  2> start or restart the beamFailureDetectionTimer;
  2> increment BFI_COUNTER by 1;
  2> if BFI_COUNTER>=beamFailureInstanceMaxCount:
    3> if the Serving Cell is SCell:
      4> trigger a BFR for this Serving Cell;
    3> else:
      4> initiate a Random Access procedure (see clause 5.1) on the SpCell.
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
  2> set BFI_COUNTER to 0.
1> if the Serving Cell is SpCell and the Random Access procedure is successfully completed (see clause 5.1):
  2> set BFI COUNTER to 0;
  2> stop the beamFailureRecoveryTimer, if configured;
  2> consider the Beam Failure Recovery procedure successfully completed.
1> else if the Serving Cell is SCell, and a PDCCH addressed to C-RNTI indicating uplink grant for a new transmission is received for the HARQ process used for the transmission of the SCell BFR MAC CE or truncated SCell BFR MAC CE which contains beam failure recovery information of this Serving Cell; or
1> if the SCell is deactivated as specified in clause 5.9:
  2> set BFI COUNTER to 0;
  2> consider the Beam Failure Recovery procedure successfully completed and cancel all the triggered BFRs for this Serving Cell.

The MAC entity shall:
1> if the Beam Failure Recovery procedure determines that at least one BFR has been triggered and not cancelled:
  2> if UL-SCH resources are available for a new transmission:
    3> if the UL-SCH resources can accommodate the SCell BFR MAC CE plus its subheader as a result of LCP:
      4> instruct the Multiplexing and Assembly procedure to generate the SCell BFR MAC CE.
    3> else if the UL-SCH resources can accommodate the truncated SCell BFR MAC CE plus its subheader as a result of LCP:
      4> instruct the Multiplexing and Assembly procedure to generate the truncated SCell BFR MAC CE.
  2> else:
    3> trigger the SR for SCell beam failure recovery.

6.1.3.23 BFR MAC CEs

The BFR MAC CEs consists of either:
SCell BFR MAC CE; or
Truncated SCell BFR MAC CE.

The BFR MAC CEs are identified by a MAC subheader with LCID as specified in Table 6.2.1-2.

BFR MAC CE has a variable size. It includes a bitmap and in ascending order based on the ServCellIndex, beam failure recovery information i.e. octets containing candidate beam availability indication (AC) for SCells indicated in the bitmap. A single octet bitmap is used when the highest ServCellIndex of this MAC entity's SCell configured with beam failure detection is less than 8, otherwise four octets are used.

The fields in the BFR MAC CEs are defined as follows:
$C_i$(SCell BFR MAC CE): This field indicates beam failure detection (as specified in clause 5.17) and the presence of an octet containing the AC field for the SCell with ServCellIndex i as specified in TS 38.331 [5]. If the $C_i$, field set to 1, beam failure is detected and the octet containing the AC field is present for the SCell with ServCellIndex i. If the $C_i$, field set to 0, the beam failure is not detected and octet containing the AC field is not present for the SCell with ServCellIndex i. The octets containing the AC field are present in ascending order based on the ServCellIndex;

$C_i$(Truncated SCell BFR MAC CE): This field indicates beam failure detection (as specified in clause 5.17) for the SCell with ServCellIndex i as specified in TS 38.331 [5]. If the $C_i$, field set to 1, beam failure is detected and the octet containing the AC field for the SCell with ServCellIndex i may be present. If the $C_i$, field set to 0, the beam failure is not detected and the octet containing the AC field is not present for the SCell with ServCellIndex i. The octets containing the AC field, if present, are included in ascending order based on the ServCellIndex. The number of octets containing the AC field included is maximised, while not exceeding the available grant size;

NOTE: The number of the octets containing the AC field in the Truncated SCell BFR format can be zero.

AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;

Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.

R: Reserved bit, set to 0.

FIG. 6.1.3.23-1: SCell BFR and Truncated SCell BFR MAC CE with the highest ServCellIndex of this MAC entity's SCell configured with BFD is less than 8

FIG. 6.1.3.23-2: SCell BFR and Truncated SCell BFR MAC CE with the highest ServCellIndex of this MAC entity's SCell configured with BFD is equal to or higher than 8

6.1.5 MAC PDU (Random Access Response)

A MAC PDU consists of one or more MAC subPDUs and optionally padding. Each MAC subPDU consists one of the following:
a MAC subheader with Backoff Indicator only;
a MAC subheader with RAPID only (i.e. acknowledgment for SI request);
a MAC subheader with RAPID and MAC RAR.

A MAC subheader with Backoff Indicator consists of five header fields E/T/R/R/BI as described in FIG. 6.1.5-1. A MAC subPDU with Backoff Indicator only is placed at the beginning of the MAC PDU, if included. 'MAC subPDU(s) with RAPID only' and 'MAC subPDU(s) with RAPID and MAC RAR' can be placed anywhere between MAC sub-PDU with Backoff Indicator only (if any) and padding (if any).

A MAC subheader with RAPID consists of three header fields E/T/RAPID as described in FIG. 6.1.5-2.

Padding is placed at the end of the MAC PDU if present. Presence and length of padding is implicit based on TB size, size of MAC subPDU(s).

FIG. 6.1.5-1: E/T/R/R/BI MAC subheader

FIG. 6.1.5-2: E/T/RAPID MAC subheader

FIG. 6.1.5-3: Example of MAC PDU consisting of MAC RARs

Figure 10:
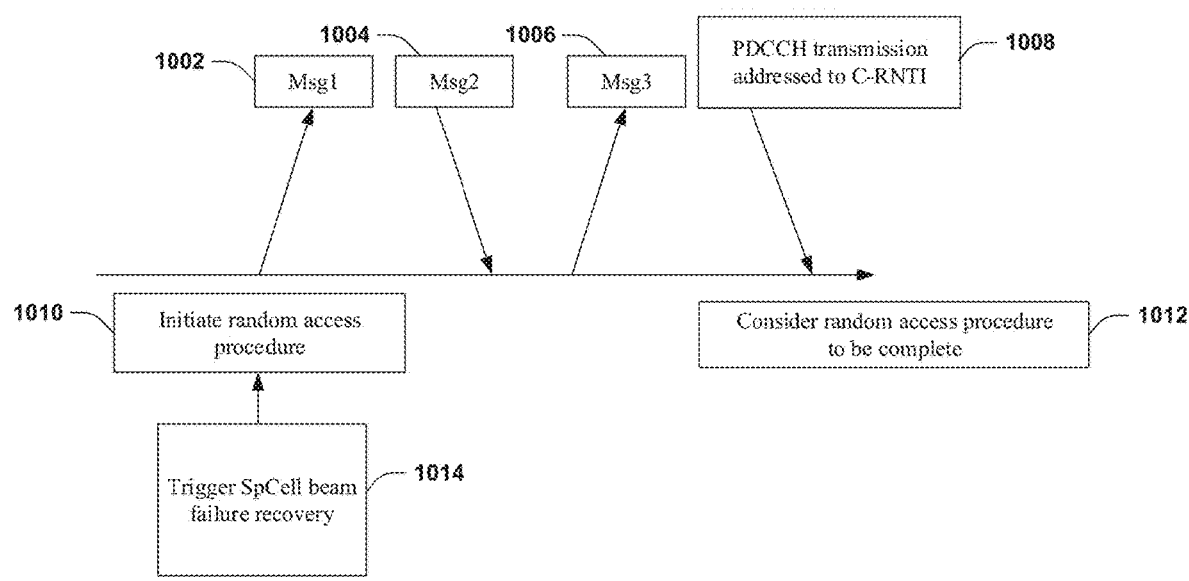
FIG. 10 is a diagram illustrating an exemplary scenario associated with a random access procedure according to one exemplary embodiment.

In some systems (such as systems in accordance with 3GPP specification), if a random access (RA) procedure is initiated for beam failure recovery (BFR), a UE considers the random access procedure to be successfully completed if a notification, indicating a reception of a Physical Downlink Control Channel (PDCCH) transmission of a Special Cell (SpCell), is received from lower layers and the PDCCH transmission is addressed to a Cell Radio Network Temporary Identifier (C-RNTI) of the UE, such as shown in FIG. 10. FIG. 10 illustrates an exemplary scenario in which the UE considers a random access procedure to be complete based on reception of a PDCCH transmission 1008 addressed to a C-RNTI of the UE. In some examples, the UE may trigger 1014 SpCell beam failure recovery associated with a SpCell. The UE may initiate 1010 the random access procedure (e.g., the random access procedure may be initiated 1010 in response to triggering 1014 the SpCell beam failure recovery). The UE may transmit a Msg1 1002 of the random access procedure. In some examples, the Msg1 1002 comprises a preamble (e.g., a Random Access Preamble) and/or may be transmitted, via a Physical Random Access Channel (PRACH) occasion, to a network. The UE may receive a Msg2 1004 of the random access procedure. In some examples, the Msg2 1004 comprises a random access response (RAR) and/or may be transmitted by the network (e.g., the network may transmit the Msg2 1004 in response to receiving the Msg1 1002). The UE may transmit a Msg3 1006 of the random access procedure. In some examples, the Msg3 1006 comprises a Medium Access Control (MAC) Control Element (CE) and/or the Msg3 1006 may be transmitted, via an Uplink Shared Channel (UL-SCH), to the network. The UE may receive a PDCCH transmission 1008 addressed to a C-RNTI of the UE. The UE may consider 1012 the random access procedure to be complete based on the reception of the PDCCH transmission 1008 addressed to the C-RNTI of the UE. Since the random access procedure is initiated 1010 in response to and/or for the SpCell beam failure recovery, and since the reception (e.g., successful reception) of the PDCCH transmission 1008 addressed to the C-RNTI of the UE indicates and/or implies that beam failure associated with the SpCell is recovered, a determination by the UE that the random access procedure is complete based on the reception of the PDCCH transmission 1008 addressed to the C-RNTI is correct (e.g., the reception of the PDCCH transmission 1008 addressed to the C-RNTI of the UE indicates and/or implies that beam failure associated with the SpCell is recovered, and thus, the UE is correct to consider the random access procedure to be complete regardless of whether the PDCCH transmission 1008 allocates a downlink (DL) assignment or whether the PDCCH transmission 1008 comprises and/or is indicative of an UL grant).

With the introduction of beam failure recovery for Secondary Cell (SCell), a random access procedure may be initiated for (and/or in response to) SCell beam failure recovery associated with a SCell. During a beam failure recovery procedure for the SCell and/or during the random access procedure, it is possible that DL traffic is ongoing in a SpCell (e.g., the UE may receive DL traffic in the SpCell during the beam failure recovery procedure for the SCell). Accordingly, successful reception, during the beam failure recovery procedure for the SCell, of a PDCCH transmission allocating a DL assignment does not imply that a gNB (associated with the SCell, for example) successfully received a Msg3 (e.g., a Msg3 of the random access procedure), and thus, reception of the PDCCH transmission allocating a DL assignment does not imply that the random access procedure and/or contention resolution of the random access procedure are successful and/or complete. Accordingly, since the beam failure recovery procedure is for the SCell (and/or since the random access procedure is initiated for the SCell beam failure recovery), reception of the PDCCH transmission allocating the DL assignment may not be a suitable condition for the UE to consider that the random access procedure and/or the contention resolution of the random access procedure are successful and/or complete.

Figure 11:
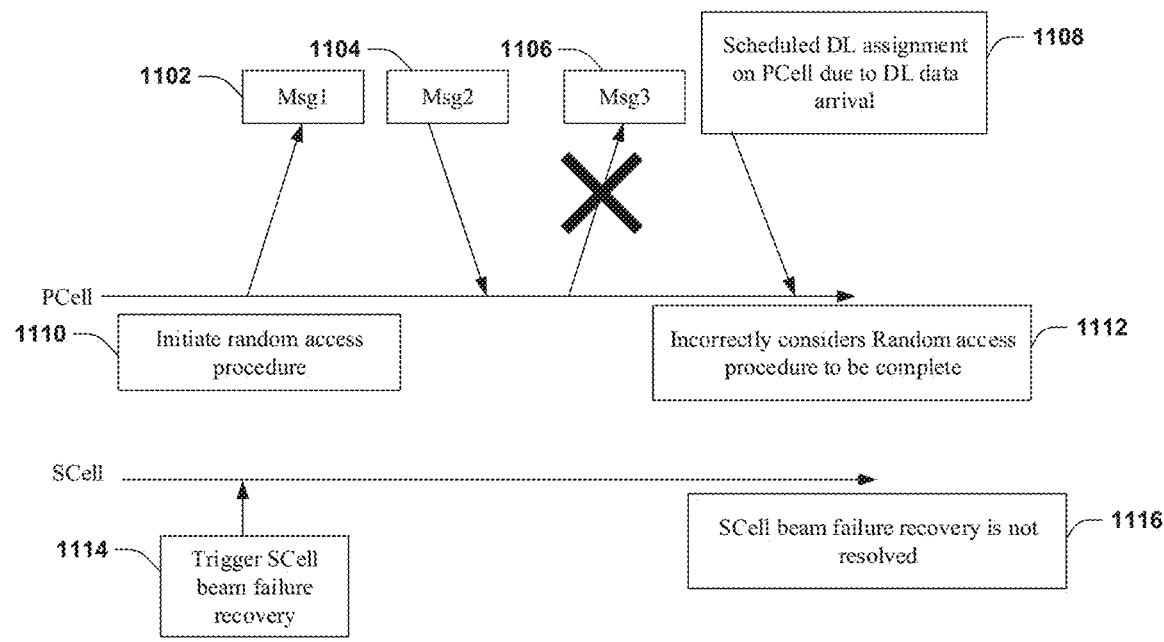
FIG. 11 is a diagram illustrating an exemplary scenario associated with a random access procedure according to one exemplary embodiment.

FIG. 11 illustrates an exemplary scenario in which a UE is configured with a Primary Cell (PCell) and a SCell of a network. In FIG. 11, a timeline of the UE with respect to the PCell is labeled PCell and a timeline of the UE with respect to the SCell is labeled SCell. In some examples, the UE may trigger 1114 SCell beam failure recovery associated with the SCell. The UE may initiate 1110 a random access procedure, such as a contention-based random access procedure, on the PCell (e.g., the random access procedure may be initiated 1110 in response to triggering 1114 the SCell beam failure recovery). The UE may transmit a Msg1 1102 of the random access procedure. In some examples, the Msg1 1102 comprises a preamble (e.g., a Random Access Preamble) and/or may be transmitted, via a PRACH occasion, to the network. The UE may receive a Msg2 1104 of the random access procedure. In some examples, the Msg2 1104 comprises a random access response and/or may be transmitted by the network (e.g., the network may transmit the Msg2 1104 in response to receiving the Msg1 1102). In some examples, the UE may generate a Msg3 1106. The Msg3 1106 may comprise a beam failure recovery MAC CE (BFR MAC CE) (e.g., a truncated BFR MAC CE). The BFR MAC CE (e.g., the truncated BFR MAC CE) may comprise beam failure information of the SCell. The UE may fail to transmit the Msg3 1106 to the network (e.g., the UE may not successfully transmit the Msg3 1106 to the network). Alternatively and/or additionally, the network may fail to receive (e.g., successfully receive) the Msg3 1106 from the UE.

Alternatively and/or additionally, scenarios are contemplated in which the network successfully receives the Msg3 1106 from the UE but does not successfully receive the beam failure information of the SCell (and/or does not successfully receive a portion of the beam failure information of the SCell). In an example, the beam failure information of the SCell may not be included in the Msg3 1106 (and/or merely a first portion of the beam failure information of the SCell may be included in the Msg3 1106 while a second portion of the beam failure information of the SCell is not included in the Msg3 1106). For example, the beam failure information of the SCell may not be included in the Msg3 1106 (and/or the second portion of the beam failure information of the SCell may not be included in the Msg3 1106) due to at least one of the BFR MAC CE not being included in Msg3 1106 (and/or merely a portion of the BFR MAC CE being included in the Msg3 1106) and/or due to the beam failure information not being included in the BFR MAC CE, such as due to a limited size of the Msg3 1106. In the example where the beam failure information of the SCell is not included in the Msg3 1106 (and/or the second portion of the beam failure information of the SCell is not included in the Msg3 1106), the network may not receive the beam failure information of the SCell (and/or the network may not receive the second portion of the beam failure information of the SCell) even if the UE successfully transmits the Msg3 1106 and the network successfully receives the Msg3 1106.

The network may schedule a DL assignment, addressed to a C-RNTI of the UE, on the PCell. For example, the UE may receive a transmission 1108 (e.g., a PDCCH transmission), indicative of the DL assignment, from the network. The DL assignment may be scheduled (and/or the transmission 1108 may be transmitted) due to DL data arrival that may be unrelated to the random access procedure for the SCell beam failure recovery (e.g., the DL assignment may be for DL data unrelated to the random access procedure and/or the SCell beam failure recovery). In a scenario in which the UE is configured to consider that the random access procedure is successfully completed and/or that a contention resolution associated with the random access procedure is successful based on reception of the transmission 1108 (e.g., a PDCCH transmission addressed to the C-RNTI of the UE), the UE may incorrectly consider 1112 the random access procedure to be successfully completed and/or the contention resolution to be successful, even though the network did not successfully receive the beam failure information of the SCell (and/or the network did not successfully receive the second portion of the beam failure information of the SCell) and the SCell beam failure recovery is not resolved 1116 (and/or not completed). In an example, the SCell beam failure recovery may not be resolved and/or completed if the network does not receive the beam failure information of the SCell (and/or if the network does not receive the second portion of the beam failure information of the SCell).

Accordingly, if a random access procedure is for (and/or in response to) SCell beam failure recovery associated with a SCell, it may not be suitable for a UE to consider contention resolution of the random access procedure to be successful based on reception of a PDCCH transmission that allocates a DL assignment (and/or that is addressed to a C-RNTI of a UE). For example, considering that contention resolution of a random access procedure is successful and/or complete based on reception of a PDCCH transmission that allocates a DL assignment (and/or that is addressed to a C-RNTI of a UE) may cause the UE to incorrectly consider the contention resolution to be successful and/or the random access procedure to be successfully completed (such as discussed in the example scenario of FIG. 11).

In some examples, the UE initiates a random access procedure for SCell beam failure recovery in order to acquire an UL grant for transmitting a BFR MAC CE (associated with the SCell beam failure recovery and/or the SCell). Accordingly, a reason and/or intention for initiating the random access procedure for the SCell beam failure recovery is to acquire the UL grant for transmitting the BFR MAC CE. Thus, a condition based on which the UE determines whether contention resolution of the random access procedure is successful should be aligned with cases in which the UE initiates the random access procedure to acquire the UL grant for transmitting the BFR MAC CE. Accordingly, if the UE initiates a random access procedure in order to acquire an UL grant for transmitting information (e.g., a BFR MAC CE), the condition should be based on whether the UE receives a PDCCH transmission, addressed to a C-RNTI of the UE, comprising an UL grant for a new transmission (e.g., a determination of whether contention resolution of the random access procedure is successful should be based on whether the UE receives a PDCCH transmission addressed to the C-RNTI and whether the PDCCH transmission comprises an UL grant for a new transmission). For example, if the UE initiates a random access procedure for SCell beam failure recovery (and/or if the UE initiates a random access procedure for a beam failure recovery that is associated with a cell other than a SpCell), the condition should be based on whether the UE receives a PDCCH transmission, addressed to a C-RNTI of the UE, comprising an UL grant for a new transmission (e.g., a determination of whether contention resolution of the random access procedure is successful should be based on whether the UE receives a PDCCH transmission addressed to the C-RNTI and whether the PDCCH transmission comprises an UL grant for a new transmission). In this way, the UE may not incorrectly determine that contention resolution of the random access response is successful in response to receiving a PDCCH transmission that does not comprise an UL grant. Rather, the UE may determine whether the PDCCH transmission comprises an UL grant (for a new transmission, for example), and determine that the contention resolution is successful and/or that the random access procedure is completed (e.g., successfully completed) based on a determination that the PDCCH transmission comprises the UL grant (for the new transmission, for example).

In some examples, a random access response grant (e.g., an UL grant indicated by a random access response in a random access procedure) may not be large enough to contain a complete BFR MAC CE. Accordingly, a Msg3 (transmitted by the UE in response to receiving the random access response, for example) may comprise merely a truncated BFR MAC CE. Accordingly, an UL grant (e.g., an additional UL grant in addition to the random access response grant) may be required for the UE to transmit at least a portion of the complete BFR MAC CE (e.g., a portion of the complete BFR MAC CE that was not transmitted in the Msg3). Alternatively and/or additionally, completion of a beam failure recovery procedure for SCell is based on reception of an UL grant. For example, if the UE transmits a BFR MAC CE via the random access response grant, the network should provide the UE with an UL grant for the Hybrid Automatic Repeat Request (HARQ) process associated with transmission of the BFR MAC CE (e.g., HARQ process 0 for Msg3 transmission), where reception of the UL grant by the UE may serve as an acknowledgment (ACK), such as an implicit ACK, for completion of the beam failure recovery procedure (e.g., reception of the UL grant may be indicative of completion of the beam failure recovery procedure).

Thus, in accordance with the present disclosure, conditions based on which the UE determines whether contention resolutions of random access procedures are successful are based on a type of beam failure recovery associated with a random access response. For example, if a random access procedure is associated with (e.g., is for and/or is initiated in response to) a SpCell beam failure recovery (e.g., a beam failure recovery of a SpCell), a condition that a contention resolution of the random access procedure is successful (and/or a condition that the random access procedure and/or the SpCell beam failure recovery are successfully completed) may be a condition that the UE receives a PDCCH transmission addressed to a C-RNTI of the UE (such as in accordance with a completion condition for beam failure recovery according to 3GPP specification). In some examples, the completion condition according to 3GPP specification for determining whether a contention resolution of a random access procedure is successful (and/or for determining whether the random access procedure and/or a beam failure recovery associated with the random access procedure are successfully completed) may be applied (and/or may only be applied) if the beam failure recovery (associated with the random access procedure) is associated with a SpCell (e.g., if the beam failure recovery is a SpCell beam failure recovery). If a random access procedure is associated with (e.g., is for and/or is initiated in response to) a SCell beam failure recovery (e.g., a beam failure recovery of a SCell), a condition that a contention resolution of the random access procedure is successful (and/or a condition that the random access procedure and/or the SCell beam failure recovery are successfully completed) may be a condition that the UE receives a PDCCH transmission that is addressed to a C-RNTI of the UE and that comprises an UL grant for a new transmission. Alternatively and/or additionally, if a random access procedure is associated with (e.g., is for and/or is initiated in response to) a SCell beam failure recovery (e.g., a beam failure recovery of a SCell), a condition that a contention resolution of the random access procedure is successful (and/or a condition that the random access procedure and/or the SCell beam failure recovery are successfully completed) may be a condition that the UE receives an UL grant with a PDCCH transmission that is addressed to a C-RNTI, where the UL grant is for a HARQ process associated with transmission of a BFR MAC CE in the random access procedure (e.g., the HARQ process may be HARQ process 0 for Msg3 transmission of the random access procedure).

Embodiment 1

In Embodiment 1, contention resolution of random access procedures for SCell beam failure recovery may be based on (e.g., only based on) a PDCCH transmission, addressed to a C-RNTI of a UE, comprising an UL grant for a new transmission.

In some examples, the UE may consider a contention resolution of a random access procedure associated with a SCell beam failure recovery to be successful (and/or the UE may consider the random access procedure to be successfully completed) if the UE receives a DL signaling, from a network, comprising an UL grant for a new transmission (where the DL signaling is addressed to the C-RNTI of the UE, for example).

Alternatively and/or additionally, the UE may not consider a contention resolution of a random access procedure associated with a SCell beam failure recovery to be successful (and/or the UE may not consider the random access procedure to be successfully completed) if the UE receives a DL signaling, from a network, that does not comprise (and does not indicate) an UL grant for a new transmission (even if the DL signaling is addressed to the C-RNTI of the UE, for example). For example, the UE may not consider a contention resolution of a random access procedure associated with a SCell beam failure recovery to be successful (and/or the UE may not consider the random access procedure to be successfully completed) if the UE receives a DL signaling, that is for DL assignment, from a network (where the DL signaling does not comprise and/or does not indicate an UL grant for a new transmission, for example).

In some examples, the UE may perform PDCCH monitoring (e.g., the UE may monitor PDCCH) for contention resolution after transmitting a Msg3 in a random access procedure. The contention resolution may be associated with the random access procedure. The random access procedure may be associated with (e.g., for) SCell beam failure recovery. The UE may not consider the contention resolution to be successful if the UE receives a first PDCCH transmission from a network that does not comprise an UL grant. The UE may consider the contention resolution to be successful if the UE receives, from a network, a second PDCCH transmission that comprises and/or is indicative of an UL grant and that is addressed to a C-RNTI of the UE.

Figure 12:
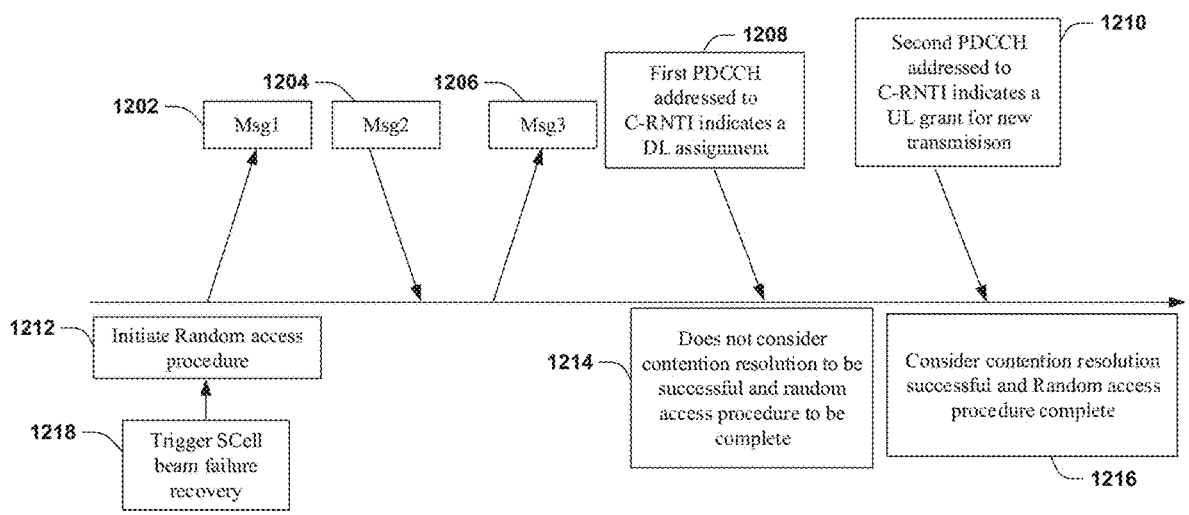
FIG. 12 is a diagram illustrating an exemplary scenario associated with a random access procedure according to one exemplary embodiment.

FIG. 12 illustrates an exemplary scenario in which a UE performs a random access procedure associated with a SCell beam failure recovery. The UE is configured with a SCell (e.g., an activated SCell) by a network. In some examples, the UE may trigger 1218 SCell beam failure recovery associated with the SCell. The UE may initiate 1212 a random access procedure in response to the SCell beam failure recovery (e.g., the random access procedure may be initiated 1212 in response to triggering 1218 the SCell beam failure recovery). The UE may transmit a Msg1 1202 of the random access procedure. In some examples, the Msg1 1202 comprises a preamble (e.g., a Random Access Preamble) and/or may be transmitted, via a PRACH occasion, to the network. The UE may receive a Msg2 1204 of the random access procedure. In some examples, the Msg2 1204 comprises a random access response and/or may be transmitted by the network (e.g., the network may transmit the Msg2 1204 in response to receiving the Msg1 1202). In some examples, the UE may generate a Msg3 1206. The UE may transmit the Msg3 1206 to the network (e.g., the UE may perform a Msg3 transmission, of the Msg3 1206, to the network). The Msg3 1206 may comprise a BFR MAC CE (e.g., the Msg3 1206 may comprise all of the BFR MAC CE or merely a portion of the BFR MAC CE). In some examples, the BFR MAC CE may comprise beam failure information of the SCell. In some examples, after (and/or in response to) transmitting the Msg3 1206, the UE may perform PDCCH monitoring (e.g., the UE may monitor PDCCH after and/or in response to transmitting the Msg3 1206) for contention resolution of the random access procedure. In some examples, the UE may receive a first PDCCH transmission 1208 (via the PDCCH monitoring, for example) that is addressed to a C-RNTI of the UE and that is indicative of a DL assignment. In some examples, the first PDCCH transmission 1208 may not comprise an UL grant for a new transmission. The UE may not consider 1214 the contention resolution to be successful and/or the random access procedure to be successfully completed in response to receiving the first PDCCH transmission 1208 (e.g., the UE may not consider 1214 the contention resolution to be successful and/or the random access procedure to be successfully completed based on a determination that the random access procedure is for the SCell beam failure recovery and/or that the first PDCCH transmission 1208 does not comprise and/or indicate an UL grant for a new transmission). For example, in response to receiving the first PDCCH transmission 1208, the UE may not determine that the contention resolution is successful and/or may not determine that the random access procedure is successfully completed (e.g., the UE may determine that the contention resolution is not yet successful and/or that the random access procedure is not yet successfully completed based on a determination that the random access procedure is for the SCell beam failure recovery and/or that the first PDCCH transmission 1208 does not comprise and/or indicate an UL grant for a new transmission). In some examples, the UE may receive a second PDCCH transmission 1210 (via the PDCCH monitoring, for example) that is addressed to the C-RNTI of the UE and that is indicative of an UL grant for a new transmission. The UE may consider 1216 the contention resolution to be successful and/or the random access procedure to be completed (e.g., successfully completed) in response to receiving the second PDCCH transmission 1210 (e.g., the UE may consider 1216 the contention resolution to be successful and/or the random access procedure to be successfully completed based on a determination that the second PDCCH transmission 1210 comprises and/or indicates the UL grant for the new transmission). For example, in response to receiving the second PDCCH transmission 1210, the UE may determine that the contention resolution is successful and/or that the random access procedure is successfully completed (e.g., successfully completed) in response to receiving the second PDCCH transmission 1210 (e.g., the UE may determine that the contention resolution is successful and/or that the random access procedure is successfully completed based on a determination that the second PDCCH transmission 1210 comprises and/or indicates the UL grant for the new transmission).

Embodiment 2

In Embodiment 2, contention resolution of random access procedures for SCell beam failure recovery may be based on (e.g., only based on) a PDCCH transmission, addressed to a C-RNTI of a UE, comprising an UL grant for a new transmission, where the UL grant and/or the new transmission are for a first HARQ process (e.g., HARQ process 0).

In some examples, the UE may consider a contention resolution of a random access procedure associated with a SCell beam failure recovery to be successful (and/or the UE may consider the random access procedure to be successfully completed) if the UE receives a DL signaling, from a network, comprising an UL grant for a new transmission, where the UL grant and/or the new transmission are for a first HARQ process (and where the DL signaling is addressed to the C-RNTI of the UE, for example). The DL signaling may indicate the first HARQ process. In some examples, the first HARQ process may be used for Msg3 transmission (e.g., the first HARQ process may be a HARQ process used for transmission of a Msg3, of the random access procedure, to the network). Alternatively and/or additionally, the first HARQ process may be HARQ process 0 (e.g., the first HARQ process may be associated with HARQ process identification (ID) 0). The first HARQ process may be used to transmit a BFR MAC CE (e.g., a truncated BFR MAC CE), such as a BFR MAC CE of the Msg3.

Alternatively and/or additionally, the UE may not consider a contention resolution of a random access procedure associated with a SCell beam failure recovery to be successful (and/or the UE may not consider the random access procedure to be successfully completed) if the UE receives a DL signaling, from a network, that comprises (and/or is indicative of) an UL grant for a new transmission, where the UL grant and/or the new transmission are for a second HARQ process (even if the DL signaling is addressed to the C-RNTI of the UE, for example). For example, the second HARQ process may be different from the first HARQ process (e.g., the second HARQ process may not be HARQ process 0). Alternatively and/or additionally, the second HARQ process may not be associated with and/or used in the random access procedure. Alternatively and/or additionally, the second HARQ process may not be used for Msg3 transmission in the random access procedure. Alternatively and/or additionally, the second HARQ process may not be used to transmit a BFR MAC CE (e.g., a truncated BFR MAC CE), such as a BFR MAC CE of a Msg3 of the random access procedure. Alternatively and/or additionally, the second HARQ process may not be used to transmit a BFR MAC CE (e.g., a truncated BFR MAC CE) comprising beam failure information of a SCell associated with the SCell beam failure recovery. For example, in response to receiving the DL signaling, the UE may not consider the contention resolution of the random access procedure to be successful based on a determination that the random access procedure is associated with (e.g., for) the SCell beam failure recovery, and at least one of a determination that the second HARQ process associated with the UL grant is different from the first HARQ process, a determination that the second HARQ process is not associated with and/or used in the random access procedure, a determination that the second HARQ process is not used for Msg3 transmission in the random access procedure, or a determination that the second HARQ process is not used to transmit a BFR MAC CE (e.g., a truncated BFR MAC CE), such as a BFR MAC CE of a Msg3 of the random access procedure and/or a BFR MAC CE comprising beam failure information of a SCell associated with the SCell beam failure recovery.

Alternatively and/or additionally, the UE may not consider a contention resolution of a random access procedure associated with a SCell beam failure recovery to be successful (and/or the UE may not consider the random access procedure to be successfully completed) if the UE receives a DL signaling, from a network, that does not comprise (and does not indicate) an UL grant (even if the DL signaling is addressed to the C-RNTI of the UE, for example). For example, the UE may not consider a contention resolution of a random access procedure associated with a SCell beam failure recovery to be successful (and/or the UE may not consider the random access procedure to be successfully completed) if the UE receives a DL signaling, that is for DL assignment, from a network (where the DL signaling does not comprise and/or does not indicate an UL grant, for example).

With respect to one or more embodiments herein, such as one or more techniques, devices, concepts, methods and/or alternatives described above, the DL signaling may be a PDCCH transmission. Alternatively and/or additionally, the DL signaling may be addressed to and/or associated with a C-RNTI of the UE.

With respect to one or more embodiments herein, the PDCCH transmission may be on a SpCell (e.g., a PCell and/or a Primary Secondary Cell Group (SCG) Cell (PSCell)). For example, the PDCCH transmission may be received by the UE on the SpCell.

With respect to one or more embodiments herein, the Msg3 (e.g., the Msg3 transmission) may comprise a BFR MAC CE (e.g., a truncated BFR MAC CE).

With respect to one or more embodiments herein, the random access procedure may be a contention-based random access procedure.

With respect to one or more embodiments herein, the random access procedure may be initiated in response to a triggered beam failure recovery.

With respect to one or more embodiments herein, the random access procedure may be on a SpCell (e.g. PCell or PSCell). For example, the random access procedure may be performed on the SpCell.

With respect to one or more embodiments herein, a random access type of the random access procedure may be 4-step random access type (4-step RA type).

With respect to one or more embodiments herein, a random access type of the random access procedure may be 2-step random access type (2-step RA type).

With respect to one or more embodiments herein, the beam failure recovery (e.g., the SCell beam failure recovery) may be triggered in response to a beam failure indication associated with a Secondary Cell.

With respect to one or more embodiments herein, the UE may transmit (to the network, for example) a random access preamble in the random access procedure (e.g., the random access preamble may be transmitted to the network via a Msg1).

With respect to one or more embodiments herein, the UE may transmit the Msg3 based on an UL grant indicated by the network in a Random Access Response (e.g., the Random Access Response may be received from the network via a Msg2). For example, the UE may use one or more UL resources of the UL grant to transmit the Msg3 to the network. The Random Access Response may comprise and/or be indicative of the UL grant.

With respect to one or more embodiments herein, the contention resolution may be associated with the random access procedure (e.g., a contention-based random access procedure).

With respect to one or more embodiments herein, the UE may consider a contention resolution of a random access procedure, associated with a PCell beam failure recovery and/or a PSCell beam failure recovery, to be successful if the UE receives a DL signaling for DL assignment from the network (and/or if the UE receives a DL signaling that does not comprise an UL grant for a new transmission).

With respect to one or more embodiments herein, the UE may consider a contention resolution of a random access procedure, associated with a PCell beam failure recovery and/or a PSCell beam failure recovery, to be successful if the UE receives a DL signaling comprising and/or indicative of an UL grant for a new transmission for a second HARQ process different from the first HARQ process (e.g., HARQ process 0).

With respect to one or more embodiments herein, the second HARQ process may be associated with a second HARQ process ID. The second HARQ process ID may be different from a HARQ process ID (e.g., 0) associated with the first HARQ process (e.g., HARQ process 0).

With respect to one or more embodiments herein, a new transmission may correspond to a transmission of data that is not a retransmission of the data. For example, a new transmission may correspond to an initial transmission of data after the data becomes available for transmission (at the UE, for example).

One, some and/or all of the foregoing techniques and/or embodiments can be formed to a new embodiment.

In some examples, embodiments disclosed herein, such as embodiments described with respect to Embodiment 1 and Embodiment 2, may be implemented independently and/or separately. Alternatively and/or additionally, a combination of embodiments described herein, such as embodiments described with respect to Embodiment 1 and/or Embodiment 2, may be implemented. Alternatively and/or additionally, a combination of embodiments described herein, such as embodiments described with respect to Embodiment 1 and/or Embodiment 2, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 13:
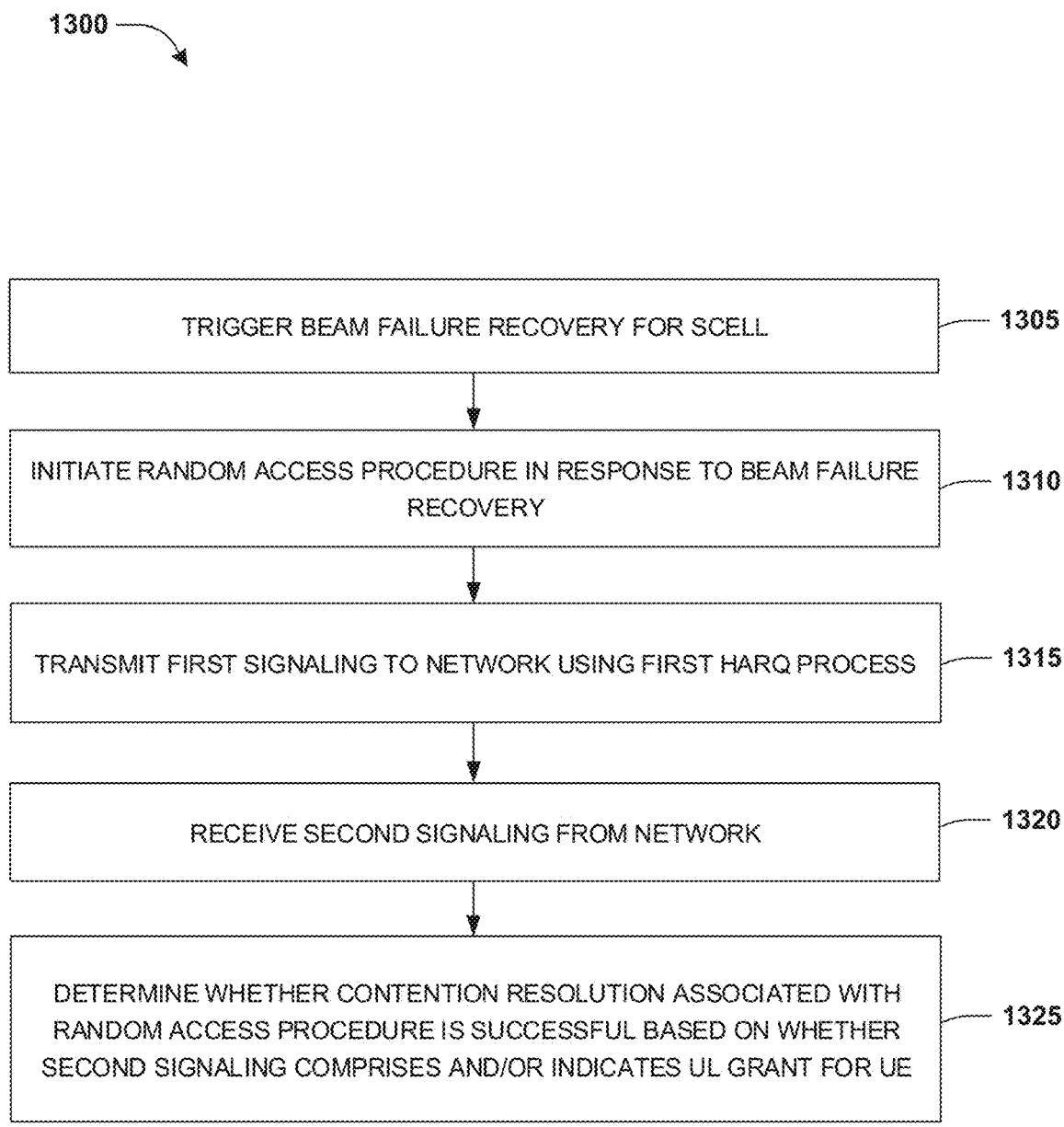
FIG. 13 is a flow chart according to one exemplary embodiment.

FIG. 13 is a flow chart 1300 according to one exemplary embodiment from the perspective of a UE. In step 1305, the UE triggers a beam failure recovery for a SCell. In step 1310, the UE initiates a random access procedure in response to the beam failure recovery (e.g., SCell beam failure recovery). In step 1315, the UE transmits a first signaling to a network using a first HARQ process. In step 1320, the UE receives a second signaling from a network. In step 1325, the UE determines whether a contention resolution associated with the random access procedure is successful based on whether the second signaling comprises and/or is indicative of an UL grant (for a new transmission, for example) for the UE (and/or whether the contention resolution associated with the random access procedure is successful may be determined based on other information in addition to whether the second signaling comprises and/or is indicative of an UL grant).

In one embodiment, the UE considers the contention resolution to be successful if the second signaling comprises and/or is indicative of an UL grant for the UE.

In one embodiment, the UE does not consider the contention resolution to be successful if the second signaling does not comprise and/or is not indicative of an UL grant for the UE.

In one embodiment, the UE does not consider the contention resolution to be successful if the second signaling comprises and/or is indicative of an UL grant (for a new transmission, for example) for a second HARQ process of the UE. The second HARQ process may be different from the first HARQ process. A second HARQ process ID of the second HARQ process may be different from a HARQ process ID (e.g., 0) associated with the first HARQ process (e.g., HARQ process 0).

In one embodiment, the UE considers the contention resolution to be successful if the second signaling comprises and/or is indicative of an UL grant for the first HARQ process for the UE.

In one embodiment, the UE transmits a preamble to the network in the random access procedure. The preamble may be transmitted before the first signaling is transmitted. The preamble may be a random access preamble.

In one embodiment, the UE receives a Random Access Response from the network before the first signaling is transmitted, wherein the Random Access Response indicates an UL grant for the UE to transmit the first signaling. The UE may transmit the first signaling using one or more UL resources of the UL grant indicated by the Random Access Response.

In one embodiment, the first signaling is a Msg3 transmission in the random access procedure.

In one embodiment, the first signaling comprises a MAC CE indicative of beam information. The beam information may comprise beam failure information of the SCell.

In one embodiment, the first signaling comprises a truncated MAC CE indicative of beam information of the SCell. The beam information may comprise beam failure information of the SCell.

In one embodiment, the UE starts a timer in response to transmitting the first signaling and restarts the timer in response to a retransmission of the first signaling. In some examples, in response to each retransmission of the first signaling by the UE, the UE may restart the timer. Alternatively and/or additionally, the UE may restart the timer in response to performing multiple retransmissions of the first signaling.

In one embodiment, the second signaling is a PDCCH transmission

In one embodiment, the second signaling is addressed to a C-RNTI associated with the UE.

In one embodiment, the beam failure recovery (e.g., the SCell beam failure recovery) is triggered in response to one or more beam failure indications associated with the SCell. The one or more beam failure indications may be received by a MAC entity of the UE from one or more layers of the UE (e.g., one or more lower layers of the UE). In some examples, the UE may trigger the beam failure recovery (e.g., the SCell beam failure recovery) in response to receiving (by the MAC entity, for example) beam failure indications associated with the SCell amounting to a threshold number of beam failure indications (from the one or more layers of the UE, for example).

Referring back to FIGS. 3 and 4, in one exemplary embodiment of a UE, the device 300 includes a program code 312 stored in the memory 310. The CPU 308 may execute program code 312 to enable the UE (i) to trigger a beam failure recovery for a SCell, (ii) to initiate a random access procedure in response to the beam failure recovery (e.g., SCell beam failure recovery), (iii) to transmit a first signaling to a network using a first HARQ process, (iv) to receive a second signaling from a network, and (v) to determine whether a contention resolution associated with the random access procedure is successful based on whether the second signaling comprises and/or is indicative of an UL grant (for a new transmission, for example) for the UE (and/or whether the contention resolution associated with the random access procedure is successful may be determined based on other information in addition to whether the second signaling comprises and/or is indicative of an UL grant). Furthermore, the CPU 308 can execute the program code 312 to perform one, some and/or all of the above-described actions and steps and/or others described herein.

Figure 14:
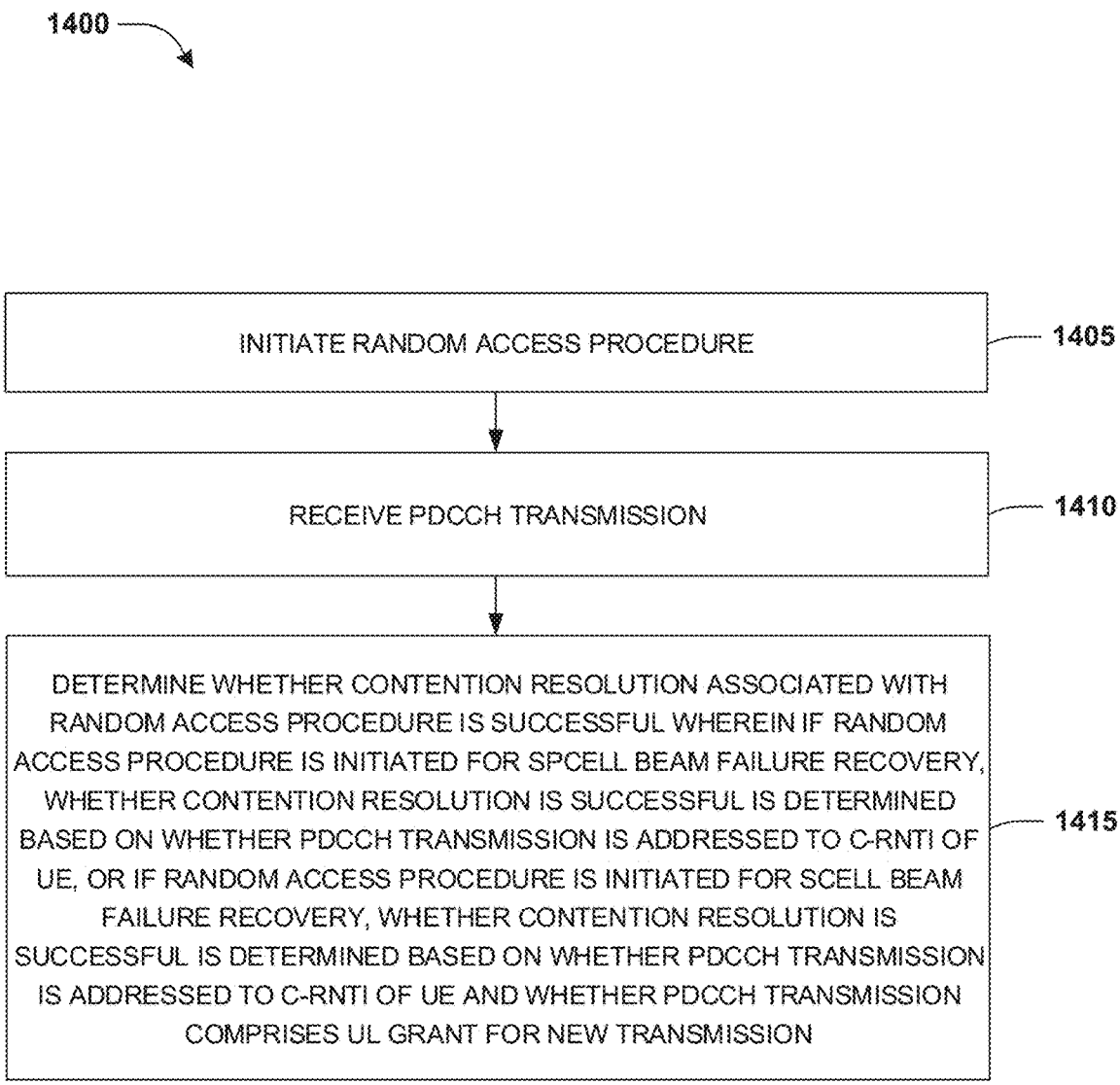
FIG. 14 is a flow chart according to one exemplary embodiment.

FIG. 14 is a flow chart 1400 according to one exemplary embodiment from the perspective of a UE. In step 1405, the UE initiates a random access procedure. In step 1410, the UE receives a PDCCH transmission. In step 1415, the UE determines whether contention resolution associated with the random access procedure is successful. If the random access procedure is initiated for SpCell beam failure recovery (e.g., if the random access procedure is initiated in response to the SpCell beam failure recovery associated with a SpCell), whether the contention resolution is successful is determined based on whether the PDCCH transmission is addressed to a C-RNTI of the UE (and/or whether the contention resolution is successful may be determined based on other information in addition to whether the PDCCH transmission is addressed to the C-RNTI of the UE). If the random access procedure is initiated for SCell beam failure recovery (e.g., if the random access procedure is initiated in response to the SCell beam failure recovery associated with a SCell), whether the contention resolution is successful is determined based on whether the PDCCH transmission is addressed to the C-RNTI of the UE and whether the PDCCH transmission comprises an UL grant for a new transmission (and/or whether the contention resolution is successful may be determined based on other information in addition to whether the PDCCH transmission is addressed to the C-RNTI of the UE and whether the PDCCH transmission comprises the UL grant for the new transmission).

In one embodiment, if the random access procedure is initiated for SpCell beam failure recovery, whether the contention resolution is successful is not determined based on whether the PDCCH transmission comprises the UL grant for the new transmission.

In one embodiment, if the random access procedure is initiated for the SCell beam failure recovery, the UE determines that the contention resolution is successful based on the PDCCH transmission being addressed to the C-RNTI of the UE and the PDCCH transmission comprising the UL grant for the new transmission. For example, if the random access procedure is initiated for the SCell beam failure recovery, the UE may consider the contention resolution to be successful if the PDCCH transmission is addressed to the C-RNTI of the UE and the PDCCH comprises the UL grant for the new transmission.

In one embodiment, the UL grant is for a HARQ process associated with transmission of a Msg3 of the random access procedure. For example, the UE may transmit the Msg3 using the HARQ process. The Msg3 may be transmitted (using the HARQ process, for example) before the UE receives the PDCCH transmission. In some examples, if the random access procedure is initiated for SCell beam failure recovery, whether the contention resolution is successful is determined based on whether the UL grant and/or the new transmission are for the HARQ process (e.g., the UE may determine that the contention resolution is successful based on the PDCCH transmission being addressed to the C-RNTI of the UE, the PDCCH transmission comprising the UL grant for the new transmission, and the UL grant and/or the new transmission being for the HARQ process).

In one embodiment, if the random access procedure is initiated for the SCell beam failure recovery, the UE does not determine that the contention resolution is successful based on the PDCCH transmission not comprising the UL grant for the new transmission (even if the PDCCH transmission is addressed to the C-RNTI of the UE). The UE may determine that the contention resolution is not yet successful based on the PDCCH transmission not comprising the UL grant for the new transmission. For example, if the random access procedure is initiated for the SCell beam failure recovery, the UE may not consider the contention resolution to be successful if the PDCCH transmission does not comprise the UL grant for the new transmission (even if the PDCCH transmission is addressed to the C-RNTI of the UE, for example). In one embodiment, the PDCCH transmission allocates a DL assignment. For example, the UE may use the DL assignment to receive a transmission from a network. In some examples, in response to determining that the contention resolution is not yet successful (and/or when the UE does not consider the contention resolution to be successful), the UE may perform PDCCH monitoring (e.g., continue performing PDCCH monitoring) for reception of a second PDCCH transmission that is addressed to the C-RNTI of the UE and that comprises the UL grant for the new transmission. In some examples, if the UE does not receive the second PDCCH transmission (and/or if the UE does not receive the second PDCCH transmission before a timer associated with the contention resolution expires), the UE may determine that the contention resolution fails. Alternatively and/or additionally, if the UE receives the second PDCCH transmission (and/or if the UE receives the second PDCCH transmission before the timer associated with the contention resolution expires), the UE may determine that the contention resolution is successful.

In one embodiment, if the random access procedure is initiated for the SpCell beam failure recovery, the UE determines that the contention resolution is successful based on the PDCCH transmission being addressed to the C-RNTI of the UE. For example, if the random access procedure is initiated for the SpCell beam failure recovery, the UE may consider the contention resolution to be successful if the PDCCH transmission is addressed to the C-RNTI of the UE. In one embodiment, the PDCCH transmission allocates a DL assignment. For example, the UE may use the DL assignment to receive a transmission from a network. In some examples, if the random access procedure is initiated for the SpCell beam failure recovery, the UE determines that the contention resolution is successful based on the PDCCH transmission being addressed to the C-RNTI of the UE, even if the PDCCH transmission does not comprise the UL grant (and/or even if the PDCCH transmission does not comprise any UL grant).

In one embodiment, if the initiating the random access procedure is performed for the SpCell beam failure recovery, the UE does not determine that the contention resolution is successful based on the PDCCH transmission not being addressed to the C-RNTI of the UE. For example, if the random access procedure is initiated for the SpCell beam failure recovery, the UE may not consider the contention resolution to be successful if the PDCCH transmission is not addressed to the C-RNTI of the UE. In some examples, in response to determining that the contention resolution is not yet successful (and/or when the UE does not consider the contention resolution to be successful), the UE may perform PDCCH monitoring (e.g., continue performing PDCCH monitoring) for reception of a second PDCCH transmission that is addressed to the C-RNTI of the UE. In some examples, if the UE does not receive the second PDCCH transmission (and/or if the UE does not receive the second PDCCH transmission before a timer associated with the contention resolution expires), the UE may determine that the contention resolution fails. Alternatively and/or additionally, if the UE receives the second PDCCH transmission (and/or if the UE receives the second PDCCH transmission before the timer associated with the contention resolution expires), the UE may determine that the contention resolution is successful.

In one embodiment, the random access procedure is initiated for the SCell beam failure recovery. The random access procedure is initiated in response to the SCell beam failure recovery (e.g., the random access procedure may be initiated in response to the SCell beam failure recovery being triggered). The SCell beam failure recovery is triggered in response to a beam failure indication associated with a SCell associated with the SCell beam failure recovery (e.g., the UE may trigger the SCell beam failure recovery in response to beam failure indications, associated with the SCell, amounting to a threshold number of beam failure indications).

In one embodiment, the UE determines that the random access procedure is successfully completed based on a determination that the contention resolution is successful. For example, the UE may determine that the random access procedure is successfully completed when the UE determines that the contention resolution is successful (and/or in response to determining that the contention resolution is successful).

In one embodiment, the determination of whether the contention resolution is successful corresponds to a determination of a contention resolution status of the random access procedure. The contention resolution status may indicate that the contention resolution is not successful until the UE determines that the contention resolution is success-ful. In some examples, the UE determines that the random access procedure is successfully completed based on a determination that the contention resolution is successful and/or based on the contention resolution status indicating that the contention resolution is successful. In some examples, when the contention resolution status indicates that the contention resolution is not yet successful, the UE may analyze DL signalings (e.g., PDCCH transmissions) received by the UE, such as using one or more of the techniques herein, to determine whether the contention resolution is successful and/or to update the contention resolution status. In an example in which the random access procedure is initiated for the SCell beam failure recovery and the PDCCH transmission does not comprise the UL grant, the UE may not determine that the contention resolution is successful and/or the contention resolution status may indicate that the contention resolution is not yet successful (e.g., the UE may not change the contention resolution status, from indicating that the contention resolution is not yet successful to indicating that the contention resolution is successful, in response to determining that the PDCCH transmission does not comprise the UL grant). When the contention resolution status indicates that the contention resolution is not yet successful (prior to expiration of a timer associated with the contention resolution, for example), the UE may perform PDCCH monitoring to receive one or more PDCCH transmissions. For example, in response to receiving a second PDCCH transmission that is addressed to the C-RNTI of the UE and that comprises the UL grant for the new transmission (prior to expiration of the timer associated with the contention resolution, for example), the UE may determine that the contention resolution is successful and/or may update the contention resolution status to indicate that the contention resolution is successful (and thus, the UE may determine that the random access procedure is successfully completed, for example). Alternatively and/or additionally, if the contention resolution status remains indicative of the contention resolution not being successful until the timer expires (and/or if the contention resolution status indicates that the contention resolution is not yet successful when the timer expires), the UE may determine that the contention resolution failed.

Referring back to FIGS. 3 and 4, in one exemplary embodiment of a UE, the device 300 includes a program code 312 stored in the memory 310. The CPU 308 may execute program code 312 to enable the UE (i) to initiate a random access procedure, (ii) to receive a PDCCH transmission, and (iii) to determine whether contention resolution associated with the random access procedure is successful, wherein: if the random access procedure is initiated for SpCell beam failure recovery, whether the contention resolution is successful is determined based on whether the PDCCH transmission is addressed to a C-RNTI of the UE (and/or whether the contention resolution is successful may be determined based on other information in addition to whether the PDCCH transmission is addressed to the C-RNTI of the UE); and/or if the random access procedure is initiated for SCell beam failure recovery, whether the contention resolution is successful is determined based on whether the PDCCH transmission is addressed to the C-RNTI of the UE and whether the PDCCH transmission comprises an UL grant for a new transmission (and/or whether the contention resolution is successful may be determined based on other information in addition to whether the PDCCH transmission is addressed to the C-RNTI of the UE and whether the PDCCH transmission comprises the UL grant for the new transmission). Furthermore, the CPU 308 can execute the program code 312 to perform one, some and/or all of the above-described actions and steps and/or others described herein.

To enhance 3GPP MAC specification for wireless communication in accordance with some embodiments herein, Enhancements 1-3 are provided herein. Enhancements 1-3 are reflective of implementation in accordance with some embodiments herein, and comprise additions to Section 5.1.5 of 3GPP specification 38.321 16.0.0. According to some embodiments, one, some, and/or all of Enhancements 1-3 and/or one, some, and/or all of Additions 1-7 (discussed below) may be implemented. A portion of Section 5.1.5 of 3GPP specification 38.321 16.0.0, without any additions of Enhancements 1-3, is quoted below:

1>if notification of a reception of a PDCCH transmission of the SpCell is received from lower layers:
  2>if the C-RNTI MAC CE was included in Msg3:
    3>if the Random Access procedure was initiated for beam failure recovery (as specified in clause 5.17) and the PDCCH transmission is addressed to the C-RNTI; or
    3>if the Random Access procedure was initiated by a PDCCH order and the PDCCH transmission is addressed to the C-RNTI; or
    3>if the Random Access procedure was initiated by the MAC sublayer itself or by the RRC sublayer and the PDCCH transmission is addressed to the C-RNTI and contains a UL grant for a new transmission:
      4>consider this Contention Resolution successful;
      4>stop ra-ContentionResolutionTimer;
      4>discard the TEMPORARY_C-RNTI;
      4>consider this Random Access procedure successfully completed.
[ . . . ]

In Enhancement 1, addition 1 is made to the portion of Section 5.1.5 of 3GPP specification 38.321 16.0.0 in accordance with some embodiments of the present disclosure, such as one or more embodiments described with respect to Embodiment 1. The addition 1 provides that, when determining whether a random access procedure is completed and/or a contention resolution of the random access procedure is successful, a UE determines that the contention resolution is successful if the random access procedure is initiated for SpCell beam failure recovery (e.g., beam failure recovery associated with a SpCell) and if the UE receives a PDCCH transmission that is addressed to a C-RNTI of the UE. Without the addition 1 of Enhancement 1, Section 5.1.5 of 3GPP specification 38.321 16.0.0 provides that when determining whether a random access procedure is completed and/or a contention resolution of the random access procedure is successful, a UE determines that the contention resolution is successful if the random access procedure is initiated for beam failure recovery (e.g., beam failure recovery associated with any type of cell, such as a SCell) and if the UE receives a PDCCH transmission that is addressed to a C-RNTI of the UE. Accordingly, by performing operations in accordance with the portion of Section 5.1.5 (as originally provided in 3GPP specification 38.321 16.0.0) the UE may incorrectly consider the contention resolution and/or the random access procedure to be successful and/or completed (such as discussed in the example scenario of FIG. 11).

The addition 1 of Enhancement 1 is in bold, and is preceded by the term "ADDITION 1 STARTS:" and followed by the term "ADDITION 1 ENDS" to distinguish the addition 1 from what is originally included in Section 5.1.5 of 3GPP specification 38.321 16.0.0.

Enhancement 1
1>if notification of a reception of a PDCCH transmission of the SpCell is received from lower layers:
  2>if the C-RNTI MAC CE was included in Msg3:
    3>if the Random Access procedure was initiated for ADDITION 1 STARTS: SpCell ADDITION 1 ENDS beam failure recovery (as specified in clause 5.17) and the PDCCH transmission is addressed to the C-RNTI; or
    3>if the Random Access procedure was initiated by a PDCCH order and the PDCCH transmission is addressed to the C-RNTI; or
    3>if the Random Access procedure was initiated by the MAC sublayer itself or by the RRC sublayer and the PDCCH transmission is addressed to the C-RNTI and contains a UL grant for a new transmission:
      4>consider this Contention Resolution successful;
      4>stop ra-ContentionResolutionTimer;
      4>discard the TEMPORARY_C-RNTI;
      4>consider this Random Access procedure successfully completed.
[ . . . ]

In Enhancement 2, additions 2-4 are made to the portion of Section 5.1.5 of 3GPP specification 38.321 16.0.0 in accordance with some embodiments of the present disclosure, such as one or more embodiments described with respect to Embodiment 2. The addition 2 provides that, when determining whether a random access procedure is completed and/or a contention resolution of the random access procedure is successful, a UE determines that the contention resolution is successful if the random access procedure is initiated for SpCell beam failure recovery (e.g., beam failure recovery associated with a SpCell) and if the UE receives a PDCCH transmission that is addressed to a C-RNTI of the UE. The addition 3 provides that, when determining whether a random access procedure is completed and/or a contention resolution of the random access procedure is successful, a UE determines that the contention resolution is successful if the random access procedure is initiated for SCell beam failure recovery (e.g., beam failure recovery associated with a SCell) and if the UE receives a PDCCH transmission that is addressed to a C-RNTI of the UE and that contains an UL grant for a new transmission for HARQ process 0. The addition 4 provides that, when determining whether a random access procedure is completed and/or a contention resolution of the random access procedure is successful, a UE determines that the contention resolution is successful if the random access procedure is not initiated for beam failure recovery, if the random access procedure is initiated by a MAC sublayer or RRC sublayer of the UE, and if the UE receives a PDCCH transmission that is addressed to a C-RNTI of the UE and that contains an UL grant for a new transmission.

The addition 2 of Enhancement 2 is in bold, and is preceded by the term "ADDITION 2 STARTS:" and followed by the term "ADDITION 2 ENDS" to distinguish the addition 2 from what is originally included in Section 5.1.5 of 3GPP specification 38.321 16.0.0. The addition 3 of Enhancement 2 is in bold, and is preceded by the term "ADDITION 3 STARTS:" and followed by the term "ADDITION 3 ENDS" to distinguish the addition 3 from what is originally included in Section 5.1.5 of 3GPP specification 38.321 16.0.0. The addition 4 of Enhancement 2 is in bold, and is preceded by the term "ADDITION 4 STARTS:" and followed by the term "ADDITION 4 ENDS"

to distinguish the addition 4 from what is originally included in Section 5.1.5 of 3GPP specification 38.321 16.0.0.

Enhancement 2
1>if notification of a reception of a PDCCH transmission of the SpCell is received from lower layers:
  2>if the C-RNTI MAC CE was included in Msg3:
    3>if the Random Access procedure was initiated for ADDITION 2 STARTS: SpCell ADDITION 2 ENDS beam failure recovery (as specified in clause 5.17) and the PDCCH transmission is addressed to the C-RNTI; or
    ADDITION 3 STARTS:
    3>if the Random Access procedure was initiated for SCell beam failure recovery (as specified in clause 5.17) and the PDCCH transmission is addressed to the C-RNTI and contains a UL grant for a new transmission for HARQ process 0; or
    ADDITION 3 ENDS
    3>if the Random Access procedure was initiated by a PDCCH order and the PDCCH transmission is addressed to the C-RNTI; or
    3>if the Random Access procedure ADDITION 4 STARTS: was not initiated for beam failure recovery and ADDITION 4 ENDS was initiated by the MAC sublayer itself or by the RRC sublayer and the PDCCH transmission is addressed to the C-RNTI and contains a UL grant for a new transmission:
      4>consider this Contention Resolution successful;
      4>stop ra-ContentionResolutionTimer;
      4>discard the TEMPORARY_C-RNTI;
      4>consider this Random Access procedure successfully completed.
    [ . . . ]

In Enhancement 3, additions 5-7 are made to the portion of Section 5.1.5 of 3GPP specification 38.321 16.0.0 in accordance with some embodiments of the present disclosure, such as one or more embodiments described with respect to Embodiment 2. The addition 5 provides that, when determining whether a random access procedure is completed and/or a contention resolution of the random access procedure is successful, a UE determines that the contention resolution is successful if the random access procedure is initiated for SpCell beam failure recovery (e.g., beam failure recovery associated with a SpCell) and if the UE receives a PDCCH transmission that is addressed to a C-RNTI of the UE. The addition 6 provides that, when determining whether a random access procedure is completed and/or a contention resolution of the random access procedure is successful, a UE determines that the contention resolution is successful if the random access procedure is initiated for SCell beam failure recovery (e.g., beam failure recovery associated with a SCell) and if the UE receives a PDCCH transmission that is addressed to a C-RNTI of the UE and that contains an UL grant for a new transmission for HARQ process 0. The addition 7 provides that, when determining whether a random access procedure is completed and/or a contention resolution of the random access procedure is successful, a UE determines that the contention resolution is successful if the random access procedure is initiated by a MAC sublayer of the UE except for beam failure recovery (e.g., the random access procedure is initiated by the MAC sublayer for one or more reasons other than a beam failure recovery and/or in response to one or more events other than a beam failure recovery) or by a RRC sublayer of the UE, and if the UE receives a PDCCH transmission that is addressed to a C-RNTI of the UE and that contains an UL grant for a new transmission.

The addition 5 of Enhancement 3 is in bold, and is preceded by the term "ADDITION 5 STARTS:" and followed by the term "ADDITION 5 ENDS" to distinguish the addition 5 from what is originally included in Section 5.1.5 of 3GPP specification 38.321 16.0.0. The addition 6 of Enhancement 3 is in bold, and is preceded by the term "ADDITION 6 STARTS:" and followed by the term "ADDITION 6 ENDS" to distinguish the addition 6 from what is originally included in Section 5.1.5 of 3GPP specification 38.321 16.0.0. The addition 7 of Enhancement 3 is in bold, and is preceded by the term "ADDITION 7 STARTS:" and followed by the term "ADDITION 7 ENDS" to distinguish the addition 7 from what is originally included in Section 5.1.5 of 3GPP specification 38.321 16.0.0.

Enhancement 3
1>if notification of a reception of a PDCCH transmission of the SpCell is received from lower layers:
  2>if the C-RNTI MAC CE was included in Msg3:
    3>if the Random Access procedure was initiated for ADDITION 5 STARTS: SpCell ADDITION 5 ENDS beam failure recovery (as specified in clause 5.17) and the PDCCH transmission is addressed to the C-RNTI; or
    ADDITION 6 STARTS:
    3>if the Random Access procedure was initiated for SCell beam failure recovery (as specified in clause 5.17) and the PDCCH transmission is addressed to the C-RNTI and contains a UL grant for a new transmission for HARQ process 0; or
    ADDITION 6 ENDS
    3>if the Random Access procedure was initiated by a PDCCH order and the PDCCH transmission is addressed to the C-RNTI; or
    3>if the Random Access procedure was initiated by the MAC sublayer itself ADDITION 7 STARTS: except for beam failure recovery ADDITION 7 ENDS or by the RRC sublayer and the PDCCH transmission is addressed to the C-RNTI and contains a UL grant for a new transmission:
      4>consider this Contention Resolution successful;
      4>stop ra-ContentionResolutionTimer;
      4>discard the TEMPORARY_C-RNTI;
      4>consider this Random Access procedure successfully completed.
    [ . . . ]

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 13-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 13-14, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling the UE to correctly determine whether a random access procedure for SCell beam failure recovery is successfully completed. For example, if a random access procedure is performed for a SCell beam failure recovery, the UE may determine whether the random access procedure is successfully completed based on whether a received PDCCH transmission is addressed to C-RNTI and whether the received PDCCH transmission comprises an UL grant.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
initiating a random access procedure;
receiving a Physical Downlink Control Channel (PDCCH) transmission; and
determining whether contention resolution associated with the random access procedure is successful, wherein:
when the initiating the random access procedure is performed for Special Cell (SpCell) beam failure recovery, the determining whether the contention resolution is successful is based on whether the PDCCH transmission is addressed to a Cell Radio Network Temporary Identifier (C-RNTI) of the UE; and
when the initiating the random access procedure is performed for Secondary Cell (SCell) beam failure recovery, the determining whether the contention resolution is successful is based on whether the PDCCH transmission is addressed to the C-RNTI of the UE and whether the PDCCH transmission comprises an uplink (UL) grant for a new transmission.

2. The method of claim 1, wherein:
when the initiating the random access procedure is performed for the SCell beam failure recovery, the determining whether the contention resolution is successful comprises determining that the contention resolution is successful based on the PDCCH transmission being addressed to the C-RNTI of the UE and the PDCCH transmission comprising the UL grant for the new transmission.

3. The method of claim 2, wherein:
the UL grant is for a Hybrid Automatic Repeat Request (HARQ) process associated with transmission of a Msg3 of the random access procedure.

4. The method of claim 1, wherein:
when the initiating the random access procedure is performed for the SCell beam failure recovery, the determining whether the contention resolution is successful comprises not determining that the contention resolution is successful based on the PDCCH transmission being addressed to the C-RNTI of the UE and the PDCCH transmission not comprising the UL grant for the new transmission.

5. The method of claim 4, wherein:
the PDCCH transmission allocates a downlink (DL) assignment.

6. The method of claim 1, wherein:
when the initiating the random access procedure is performed for the SpCell beam failure recovery, the determining whether the contention resolution is successful comprises determining that the contention resolution is successful based on the PDCCH transmission being addressed to the C-RNTI of the UE.

7. The method of claim 6, wherein:
the PDCCH transmission allocates a downlink (DL) assignment.

8. The method of claim 1, wherein:
when the initiating the random access procedure is performed for the SpCell beam failure recovery, the determining whether the contention resolution is successful comprises not determining that the contention resolution is successful based on the PDCCH transmission not being addressed to the C-RNTI of the UE.

9. The method of claim 1, wherein:
the SCell beam failure recovery is triggered responsive to a beam failure indication associated with a SCell.

10. The method of claim 1, comprising:
determining that the random access procedure is successfully completed based on a determination that the contention resolution is successful.

11. A User Equipment (UE) comprising:
a control circuit;
a processor installed in the control circuit; and
a memory installed in the control circuit and operatively coupled to the processor, wherein the processor is configured to execute a program code stored in the memory to perform operations, the operations comprising:
initiating a random access procedure;
receiving a Physical Downlink Control Channel (PDCCH) transmission; and
determining whether contention resolution associated with the random access procedure is successful, wherein:
when the initiating the random access procedure is performed for Special Cell (SpCell) beam failure recovery, the determining whether the contention resolution is successful is based on whether the PDCCH transmission is addressed to a Cell Radio Network Temporary Identifier (C-RNTI) of the UE; and
when the initiating the random access procedure is performed for Secondary Cell (SCell) beam failure recovery, the determining whether the contention resolution is successful is based on whether the PDCCH transmission is addressed to the C-RNTI of the UE and whether the PDCCH transmission comprises an uplink (UL) grant for a new transmission.

12. The UE of claim 11, wherein:
when the initiating the random access procedure is performed for the SCell beam failure recovery, the determining whether the contention resolution is successful comprises determining that the contention resolution is successful based on the PDCCH transmission being addressed to the C-RNTI of the UE and the PDCCH transmission comprising the UL grant for the new transmission.

13. The UE of claim 12, wherein:
the UL grant is for a Hybrid Automatic Repeat Request (HARQ) process associated with transmission of a Msg3 of the random access procedure.

14. The UE of claim 11, wherein:
when the initiating the random access procedure is performed for the SCell beam failure recovery, the determining whether the contention resolution is successful comprises not determining that the contention resolution is successful based on the PDCCH transmission being addressed to the C-RNTI of the UE and the PDCCH transmission not comprising the UL grant for the new transmission.

15. The UE of claim 14, wherein:
the PDCCH transmission allocates a downlink (DL) assignment.

16. The UE of claim 11, wherein:
when the initiating the random access procedure is performed for the SpCell beam failure recovery, the determining whether the contention resolution is successful comprises determining that the contention resolution is successful based on the PDCCH transmission being addressed to the C-RNTI of the UE.

17. The UE of claim 16, wherein:
the PDCCH transmission allocates a downlink (DL) assignment.

18. The UE of claim 11, wherein:
when the initiating the random access procedure is performed for the SpCell beam failure recovery, the determining whether the contention resolution is successful comprises not determining that the contention resolution is successful based on the PDCCH transmission not being addressed to the C-RNTI of the UE.

19. The UE of claim 11, the operations comprising:
determining that the random access procedure is successfully completed based on a determination that the contention resolution is successful.

20. A non-transitory computer-readable medium comprising processor-executable instructions that when executed by a User Equipment (UE) cause performance of operations, the operations comprising:
 initiating a random access procedure;
 receiving a Physical Downlink Control Channel (PDCCH) transmission; and
 determining whether contention resolution associated with the random access procedure is successful, wherein:
  when the initiating the random access procedure is performed for Special Cell (SpCell) beam failure recovery, the determining whether the contention resolution is successful is based on whether the PDCCH transmission is addressed to a Cell Radio Network Temporary Identifier (C-RNTI) of the UE; and
  when the initiating the random access procedure is performed for Secondary Cell (SCell) beam failure recovery, the determining whether the contention resolution is successful is based on whether the PDCCH transmission is addressed to the C-RNTI of the UE and whether the PDCCH transmission comprises an uplink (UL) grant for a new transmission.

* * * * *